Oct. 31, 1950 D. W. RUBIDGE ET AL 2,528,453

RECORD CONTROLLED MULTIPLYING MACHINE

Filed May 29, 1947 24 Sheets-Sheet 1

INVENTORS
DAVID W. RUBIDGE
ORVILLE B. SHAFER
BY
F. W. Lowenitzer
ATTORNEY

Oct. 31, 1950 D. W. RUBIDGE ET AL 2,528,453

RECORD CONTROLLED MULTIPLYING MACHINE

Filed May 29, 1947 24 Sheets-Sheet 2

INVENTORS
DAVID W. RUBIDGE
ORVILLE B. SHAFER

BY J. W. Lowenitzer
ATTORNEY

RECORD CONTROLLED MULTIPLYING MACHINE

INVENTORS
DAVID W. RUBIDGE
ORVILLE B. SHAFER
BY
J. W. Lowenitzer
ATTORNEY

INVENTORS
DAVID W. RUBIDGE
ORVILLE B. SHAFER
BY F. W. Lowitzer
ATTORNEY

RECORD CONTROLLED MULTIPLYING MACHINE

INVENTORS
DAVID W. RUBIDGE
ORVILLE B. SHAFER
BY
J. W. Lowenitzer
ATTORNEY

Oct. 31, 1950 D. W. RUBIDGE ET AL 2,528,453

RECORD CONTROLLED MULTIPLYING MACHINE

Filed May 29, 1947 24 Sheets-Sheet 6

INVENTORS
DAVID W. RUBIDGE
ORVILLE B. SHAFER
BY
J. W. Lovenitzer
ATTORNEY

Oct. 31, 1950 D. W. RUBIDGE ET AL 2,528,453

RECORD CONTROLLED MULTIPLYING MACHINE

Filed May 29, 1947 24 Sheets-Sheet 7

INVENTORS
DAVID W. RUBIDGE
ORVILLE B. SHAFER
BY F. W. Lowinitzer
ATTORNEY

Oct. 31, 1950 D. W. RUBIDGE ET AL 2,528,453

RECORD CONTROLLED MULTIPLYING MACHINE

Filed May 29, 1947 24 Sheets-Sheet 8

TIMING FOR TWO PERIOD COMPUTATIONS

INVENTORS
DAVID W. RUBIDGE
ORVILLE B. SHAFER
BY J. W. Lowenitzer
ATTORNEY

Oct. 31, 1950 D. W. RUBIDGE ET AL 2,528,453

RECORD CONTROLLED MULTIPLYING MACHINE

Filed May 29, 1947 24 Sheets-Sheet 9

TIMING FOR TWO PERIOD COMPUTATIONS

INVENTORS
DAVID W. RUBIDGE
ORVILLE B. SHAFER
BY F. W. Lowenitzer
ATTORNEY

RECORD CONTROLLED MULTIPLYING MACHINE

INVENTORS
DAVID W. RUBIDGE
ORVILLE B. SHAFER
BY J. W. Lowmiller
ATTORNEY

Oct. 31, 1950 D. W. RUBIDGE ET AL 2,528,453

RECORD CONTROLLED MULTIPLYING MACHINE

Filed May 29, 1947 24 Sheets-Sheet 11

INVENTORS
DAVID W. RUBIDGE
ORVILLE B. SHAFER
BY
J. W. Lovenitzer
ATTORNEY

RECORD CONTROLLED MULTIPLYING MACHINE

INVENTORS
DAVID W. RUBIDGE
ORVILLE B. SHAFER
BY
J. W. Lowmiller
ATTORNEY

RECORD CONTROLLED MULTIPLYING MACHINE

Filed May 29, 1947 24 Sheets-Sheet 13

INVENTORS
DAVID W. RUBIDGE
ORVILLE B. SHAFER
BY F. W. Lorenitzer
ATTORNEY

RECORD CONTROLLED MULTIPLYING MACHINE

INVENTORS
DAVID W. RUBIDGE
ORVILLE B. SHAFER
BY J. W. Lounitzer
ATTORNEY

RECORD CONTROLLED MULTIPLYING MACHINE

INVENTORS
DAVID W. RUBIDGE
ORVILLE B. SHAFER
BY F. W. Lowenitzer
ATTORNEY

Oct. 31, 1950 D. W. RUBIDGE ET AL 2,528,453

RECORD CONTROLLED MULTIPLYING MACHINE

Filed May 29, 1947 24 Sheets-Sheet 16

INVENTORS
DAVID W. RUBIDGE
ORVILLE B. SHAFER
BY F. W. Lowenitzer
ATTORNEY

INVENTORS
DAVID W. RUBIDGE
ORVILLE B. SHAFER
BY
J. W. Lowenitzer
ATTORNEY

INVENTORS
DAVID W. RUBIDGE
ORVILLE B. SHAFER
BY
J. W. Lowenitzer
ATTORNEY

RECORD CONTROLLED MULTIPLYING MACHINE

INVENTORS
DAVID W. RUBIDGE
ORVILLE B. SHAFER
BY J. W. Lowenitzer
ATTORNEY

INVENTORS
DAVID W. RUBIDGE
ORVILLE B. SHAFER
BY J. W. Lowmitzer
ATTORNEY

RECORD CONTROLLED MULTIPLYING MACHINE

Filed May 29, 1947 24 Sheets-Sheet 21

INVENTORS
DAVID W. RUBIDGE
ORVILLE B. SHAFER
BY F. W. Lowenitzer
ATTORNEY

ENTRY CONTROL RELAYS

INVENTORS
DAVID W. RUBIDGE
ORVILLE B. SHAFER
BY
J. W. Lowmitzer
ATTORNEY

RECORD CONTROLLED MULTIPLYING MACHINE

INVENTORS
DAVID W. RUBIDGE
BY ORVILLE B. SHAFER
J. W. Lowenitzer
ATTORNEY

RECORD CONTROLLED MULTIPLYING MACHINE

Filed May 29, 1947 24 Sheets-Sheet 24

INVENTORS
DAVID W. RUBIDGE
ORVILLE B. SHAFER
BY J. W. Lowenitzer
ATTORNEY

Patented Oct. 31, 1950 2,528,453

UNITED STATES PATENT OFFICE 2,528,453

RECORD CONTROLLED MULTIPLYING MACHINE

David W. Rubidge, Chatham, N. J., and Orville B. Shafer, Owego, N. Y., assignors to International Business Machines Corporation, New York, N. Y., a corporation of New York Application May 29, 1947, Serial No. 751,266

13 Claims. (Cl. 235—61.6)

The present invention concerns multiplying machines of the type which are capable of effecting the multiplication of factors representing parts per machine to be manufactured and the number of machines of selected models to be manufactured during a certain period to obtain products which will forecast the number of different parts required for the machines to be manufactured in said certain period. However, it is to be understood that this is only an illustrative use of the improvements and is not to be construed as a limitation of the invention.

In order to better understand what the invention consists of the following explanation will be helpful.

The present multiplying machine is particularly useful for determining and computing production requirements, i. e., to find the number of parts or components required for a manufacturing period according to the models to be made and number of machines in each model to be manufactured in this period. The present machine provides by the result of an adding and multiplying computation a forecast of such component parts or requirements.

For the purposes of illustration it will be assumed that the problem is to find the number of different parts required to manufacture a number of automobiles of different models. With this prior knowledge it is possible to know the labor, material and other requirements necessary to manufacture the required number of automobiles. By the passage of a series of cards, each of which has indicated thereon the number of parts for each model and the particular models to be manufactured, the number of parts necessary are calculated. For example, each automobile may require five hub caps, 324 bolts of the same kind, and such figures in each card comprise one factor of the computation, herein designated the multiplier factor, although it may be called the multiplicand factor. The number of parts required for each automobile is punched on each card, as 324 in the card shown in Fig. 4.

The other factor comprises the total of the number of automobiles made in each of the different models and in view of the fact that the number of different models usually comprise many numbers it is not practical to punch each card to represent the number of automobiles of each model to be manufactured. In the card of Fig. 4 five columns 43–47 are allotted to represent the models to be made, and by reserving eleven index points for each column, fifty-five different models may be designated. The number of models to be made are set up on a plugboard and represent fifty-five preset multiplicand amounts which are individually selected by the fifty-five perforations in said five columns.

By entering these selected preset multiplicands in a series of accumulators and additively combining the amounts in a single accumulator, the total of the selected preset multiplicands is derived. This constitutes the other factor of multiplication. By multiplying each total multiplicand amount and the multiplier factor on the same card the number of parts of the same kind required to manufacture a number of automobiles of different models is derived, which is represented on the card by punching the computed product.

In the above the desired computation is explained by reference to the manufacture of automobiles but is merely an illustration of one use of the computing machine. It is to be understood that the complete arrangement, or subcombinations of such arrangements may be found useful in other applications and in other forms of computing machines.

The invention viewed as a novel multiplying machine is to provide a plurality of preset means which represent a plurality of factors involved in a multiplying computation, and the provision of means, which may be under control of a perforated record, to select the plurality of preset factor means which accumulatively represent the desired factor amounts.

A further feature of the invention relates to the provision of means to accumulatively combine prior to multiplication the plurality of selected factor amounts in one amount receiving device and utilize such device as the instrumentality for effecting the multiplication operation.

Another feature of the invention related to the preceding means is to effect the entry of the selected plurality of preset multiplicands in a plurality of receiving devices, and to then effect, prior to multiplication, successive transfer operations between them to accumulatively enter the final multiplication factor in one single amount representing device which is the instrumentality utilized for effecting multiplication operations.

Another feature of the invention which relates to the form of machine wherein the preset factor amounts are selected by record perforations is to enable the selection of a large number of preset factor amounts by having a single perforation in a record select the desired preset factor, and to have the preset factor set up means changeable to represent variable amounts, changeable and readily at the will of the operator.

The advantage of the preceding construction is that the possibility of setting up such variable factors and the selection of each by a single perforation, makes it unnecessary to represent on the record itself the plurality of factor amounts, thus conserving record space, which for a practical form of machine embodying the present invention would not be available for designation in record cards of standard size.

A further feature of the invention relating to the incorporation of the present invention in a record card controlled machine is to allocate a plurality of columns of a record to represent a fixed factor in multiplication and to allocate a plurality of other columns for selection of the desired other factor amounts set up in the machine, with one index point for each card column allocated to select a desired other factor amount.

A further feature of the invention when incorporated in a record controlled machine is to effect a factor setup in each of a plurality of factor representing storage means, a plurality of factor representing storage means being assigned for each card column, and to enter by subsequent successive entering cycles under control of the selected factor representing storage means the selected factor amounts represented thereby.

Obviously, since each column may designate and select one or more factor amounts it is undesirable to have such successive entering cycles comprise a fixed number, which would be eleven in the present machine, and therefore another feature of the invention relates to the provision of a cycle limiting device which limits the number of entering cycles to the least number required to effect all preset factor entries represented in one or a plurality of factor selecting card columns.

Another feature of the invention related to the preceding feature is to provide an entry cycle limiting device governed by the card column which represents the greatest number of selected factor amounts to be entered.

Another feature of the invention relates to the provision of means to enter under control of the plurality of factor representing storage means related to each card column the selected factor amounts in a correlated common amount receiving device, or accumulator, and to then effect successive combining and amount entering cycles to accumulatively enter the amounts in all of the accumulators, in a selected one or different accumulator which is utilized as the instrumentality to effect multiplication.

The invention also concerns the provision of means to initiate the multiplying computation after the completion of the entry combining cycles, and to represent the product on the same record on which the one factor used in the computation was represented and the selected preset other factors are indicated or designated.

Another feature of the invention relates to the provision of auxiliary means to condition the machine to effect two multiplying computations for each card, specified herein as "first period" and "second period" computations.

In the present machine this feature of the invention consists of the provision of means to split or divide the plurality of groups of factor representing storage means in two groups, one representing selected factors used in the first period computation and the other representing selected factors used in a second period computation.

Accordingly the present invention comprises an arrangement which effects a first period multiplying computation by the accumulatively combined preset selected factors of the first computation and the other fixed factor, and then effects a second period multiplying computation by other accumulatively preset selected factors of the second computation and the other fixed factor.

As an adjunct to the provision of means to designate the product result on the record, the present invention includes an arrangement for having the product result of each first and second period computation recorded on a record, and preferably the same record used to control the first and second period computation.

Another feature of the invention relates to the provision of means to retain said fixed factor amount in order to be used in each of the first and second period computations successively.

Another feature of the invention comprises the provision of a single conditioning means which will condition the machine to effect either a single period multiplying computation effected according to the invention, or two successive first and second period multiplying computations, each carried out according to the present invention.

In said drawings:

Figs. 1 and 1*a* taken together show a somewhat diagrammatic view of the various units of the machine, and also the driving mechanism for the various units.

Figs. 2 and 2*a* taken together show a somewhat diagrammatic view of the punching section of the machine.

Fig. 2*b* is a detail view of part of the punch.

Figure 6A:
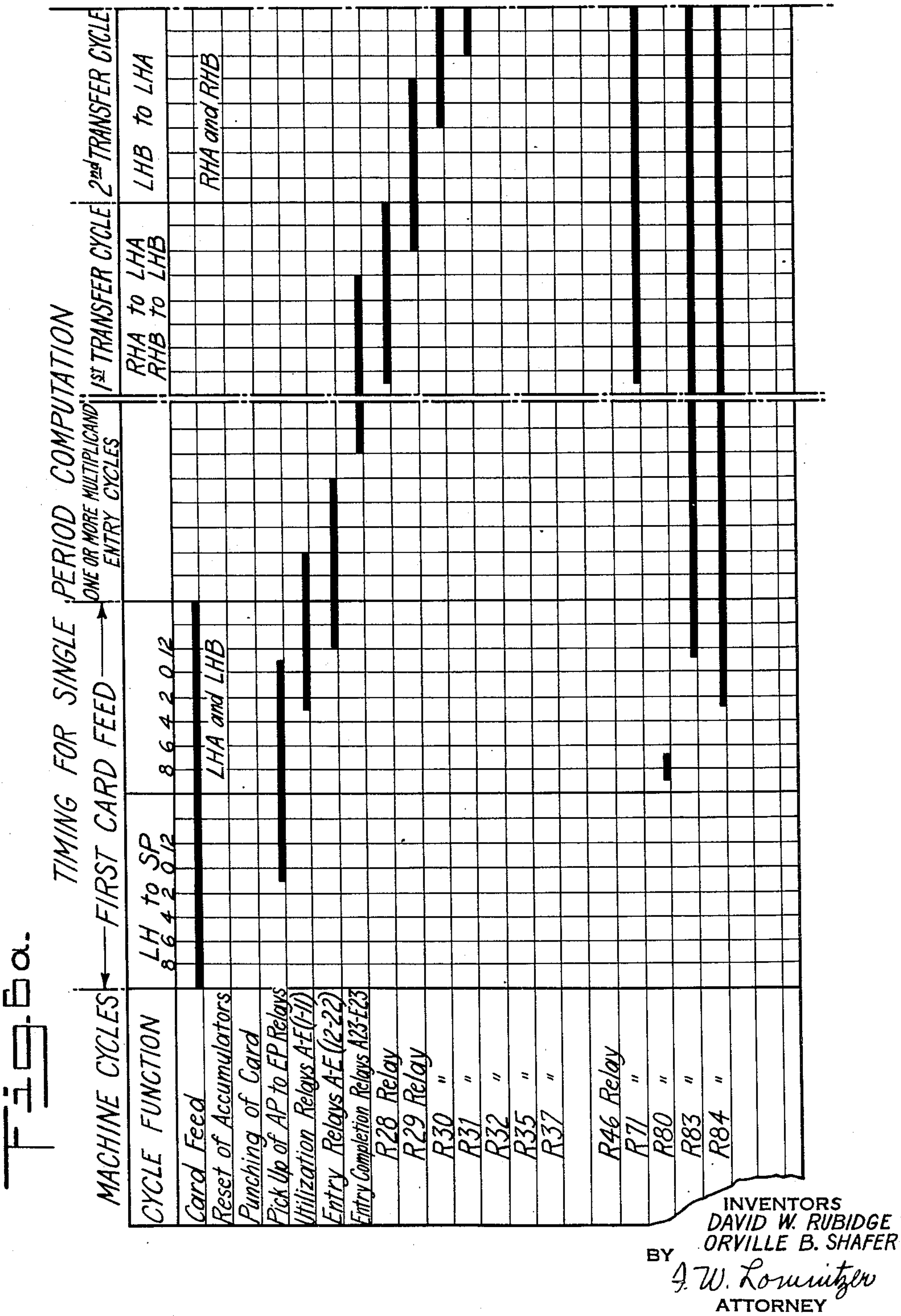
Figure 6B:
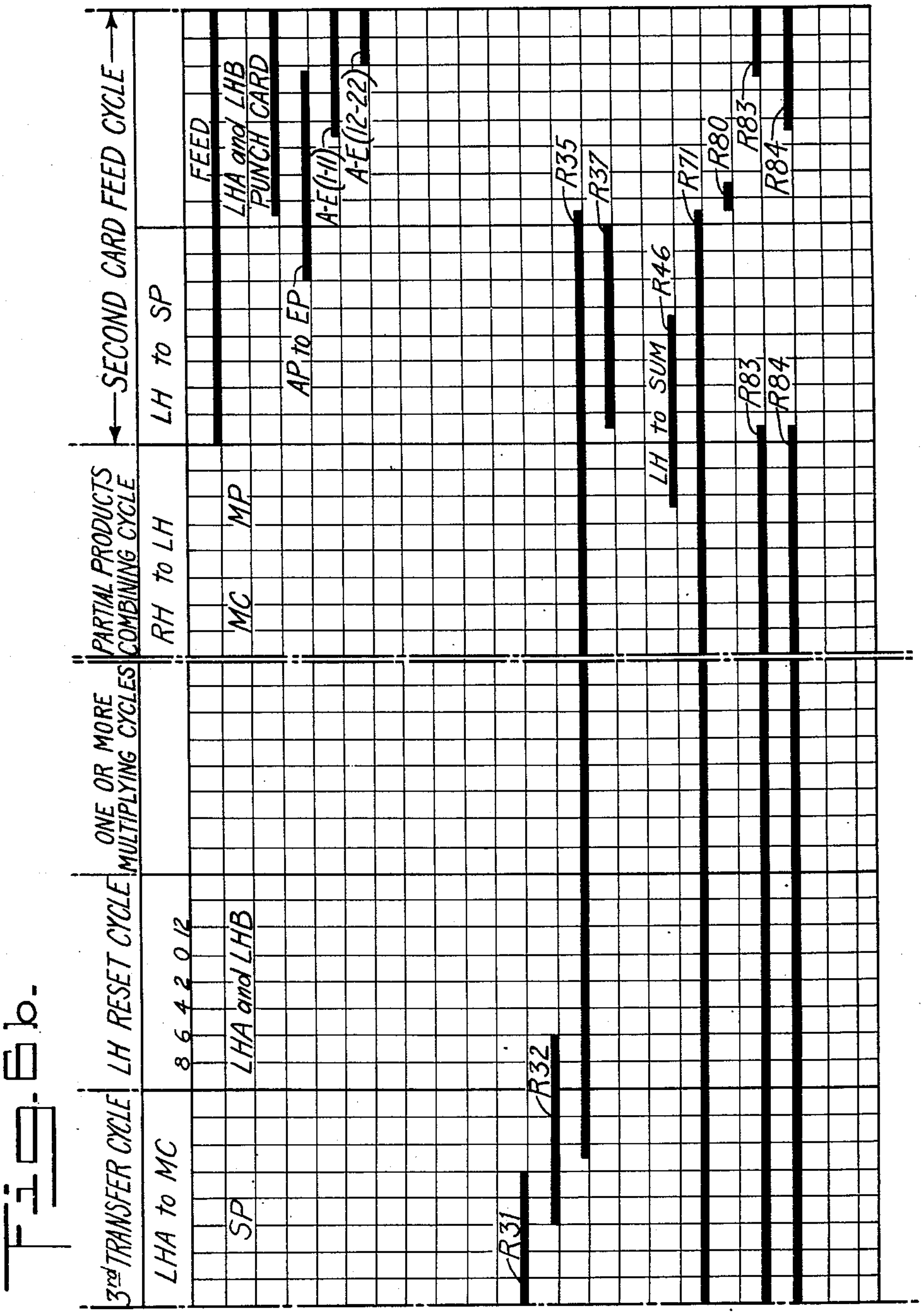

Figs. 6*a*, 6*b*, when arranged in the order named constitute a timing diagram for a single period computation and show the sequence of operations and the timing of the relays added to the basic machine.

Figure 7A:
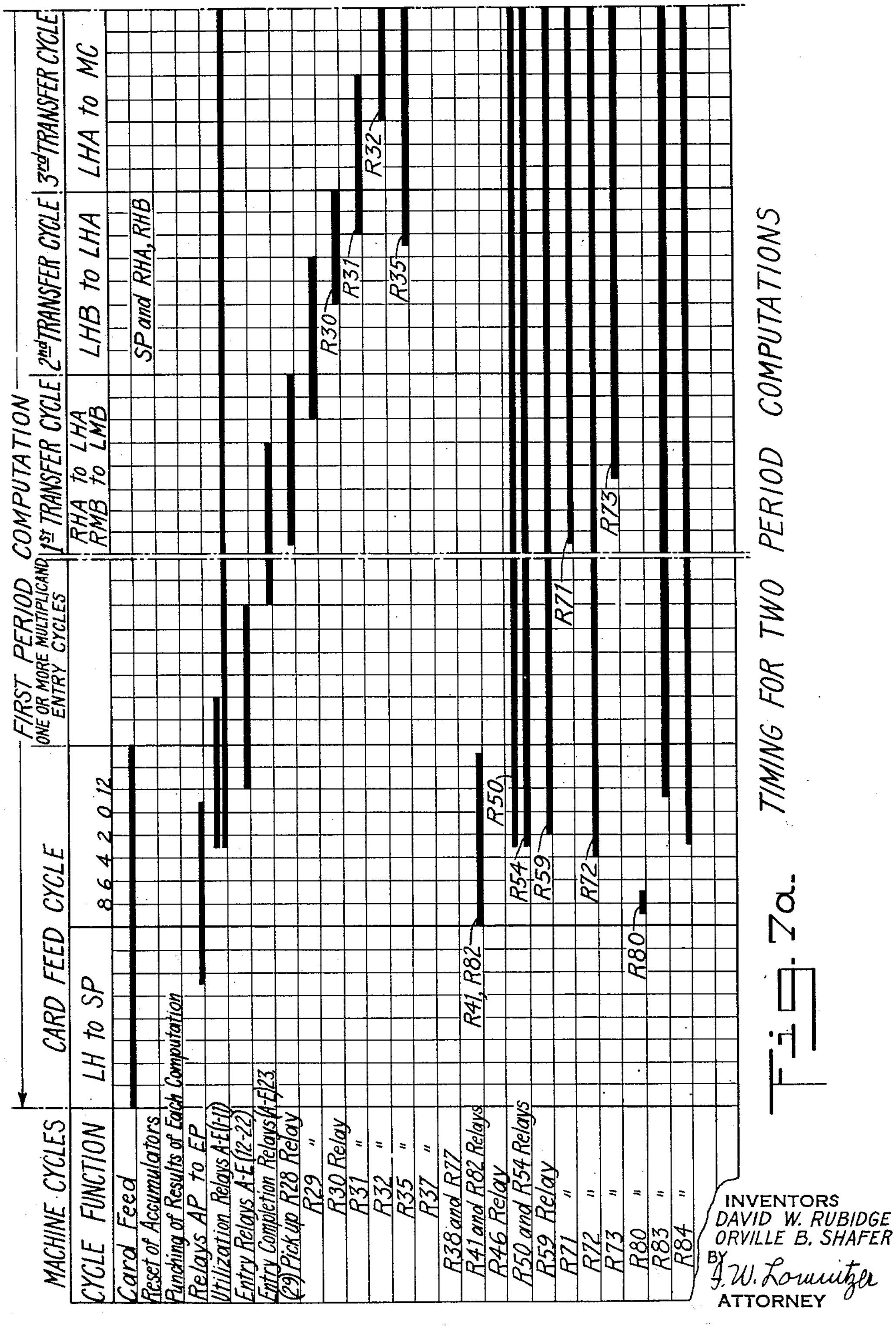
Figure 7B:
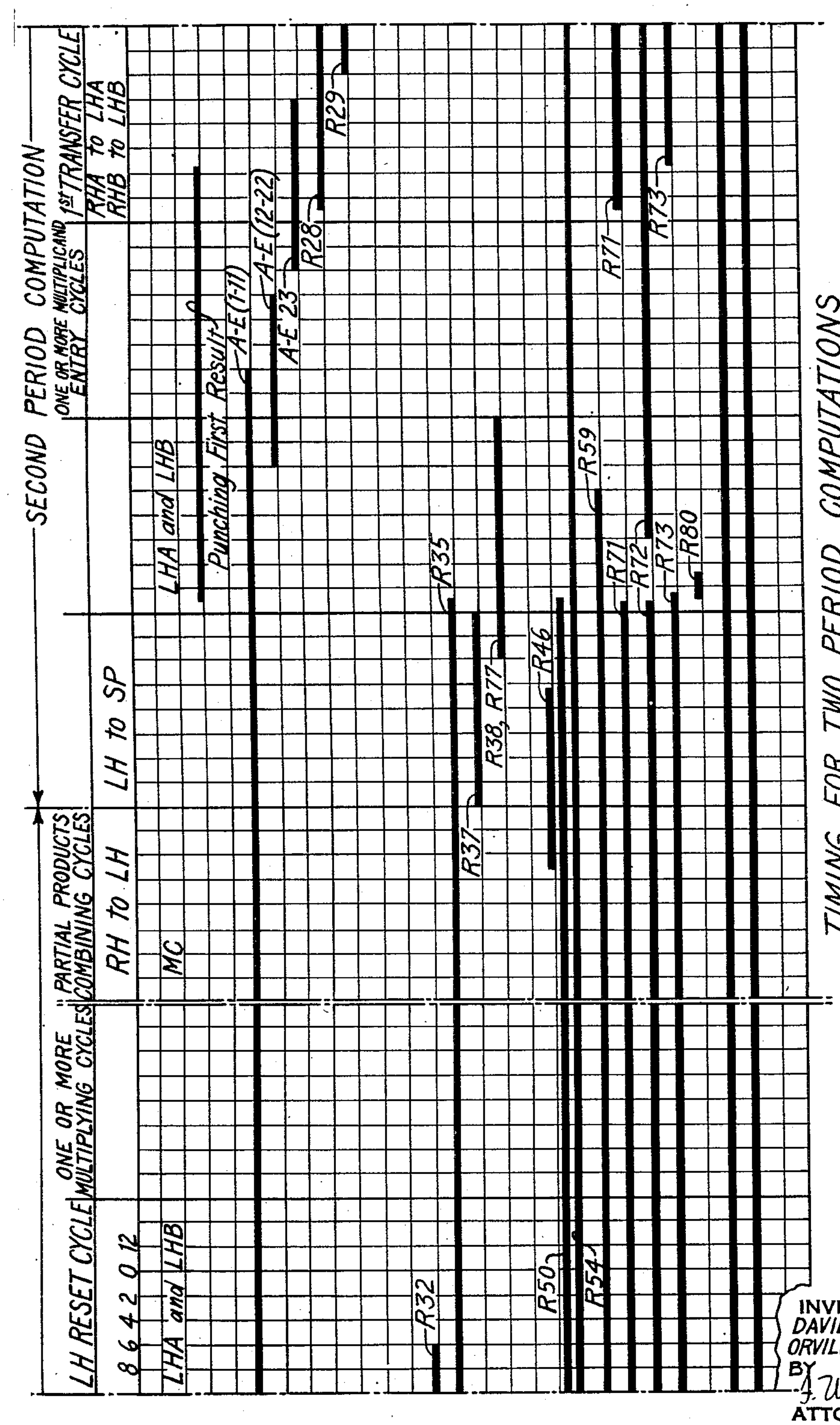
Figure 7C:
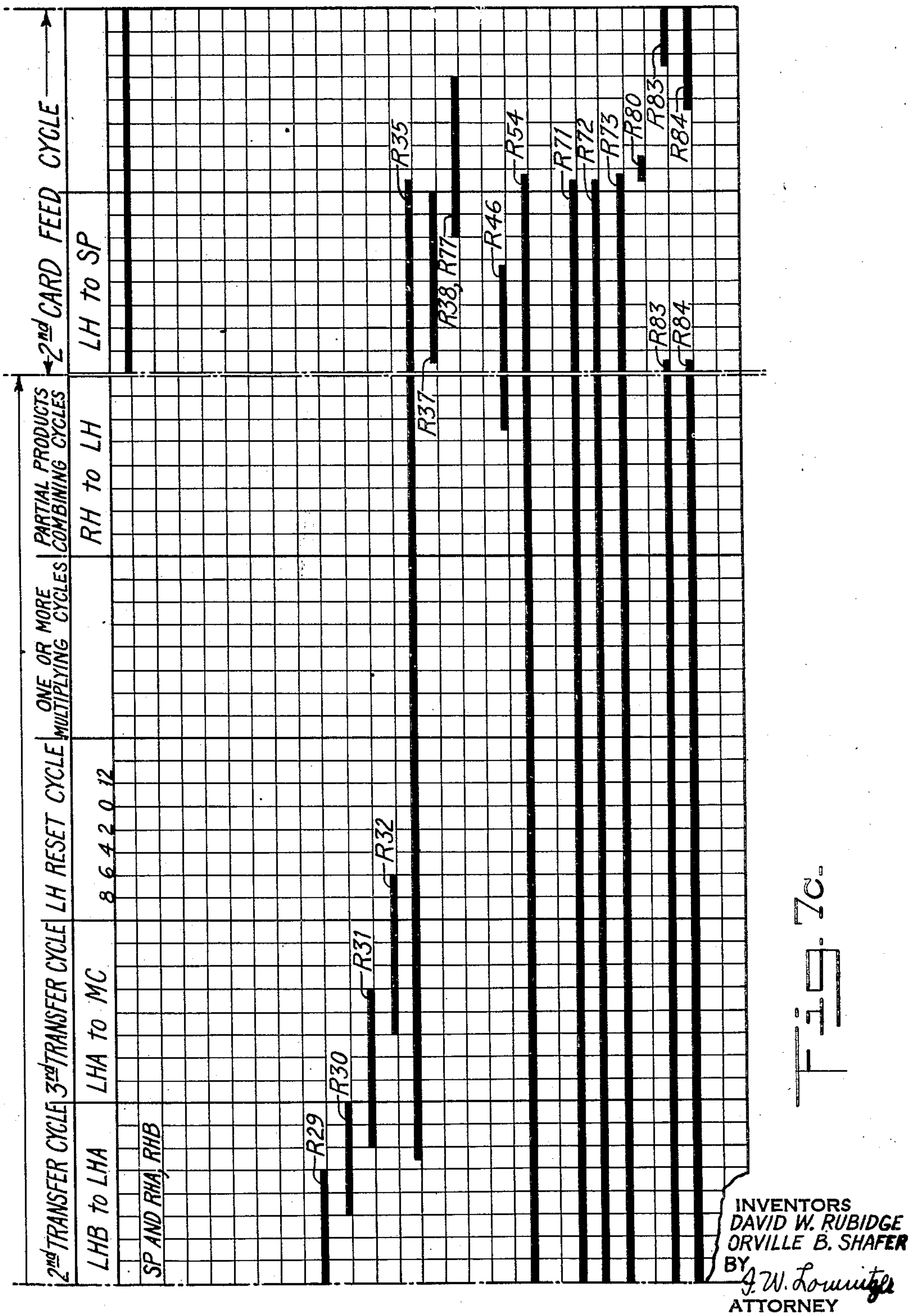

Figs. 7*a*, 7*b*, 7*c* when arranged in the order named constitute a timing diagram for a multiperiod computation and show the sequence of operations and the timing of the relays added to the basic machine.

Figure 8:
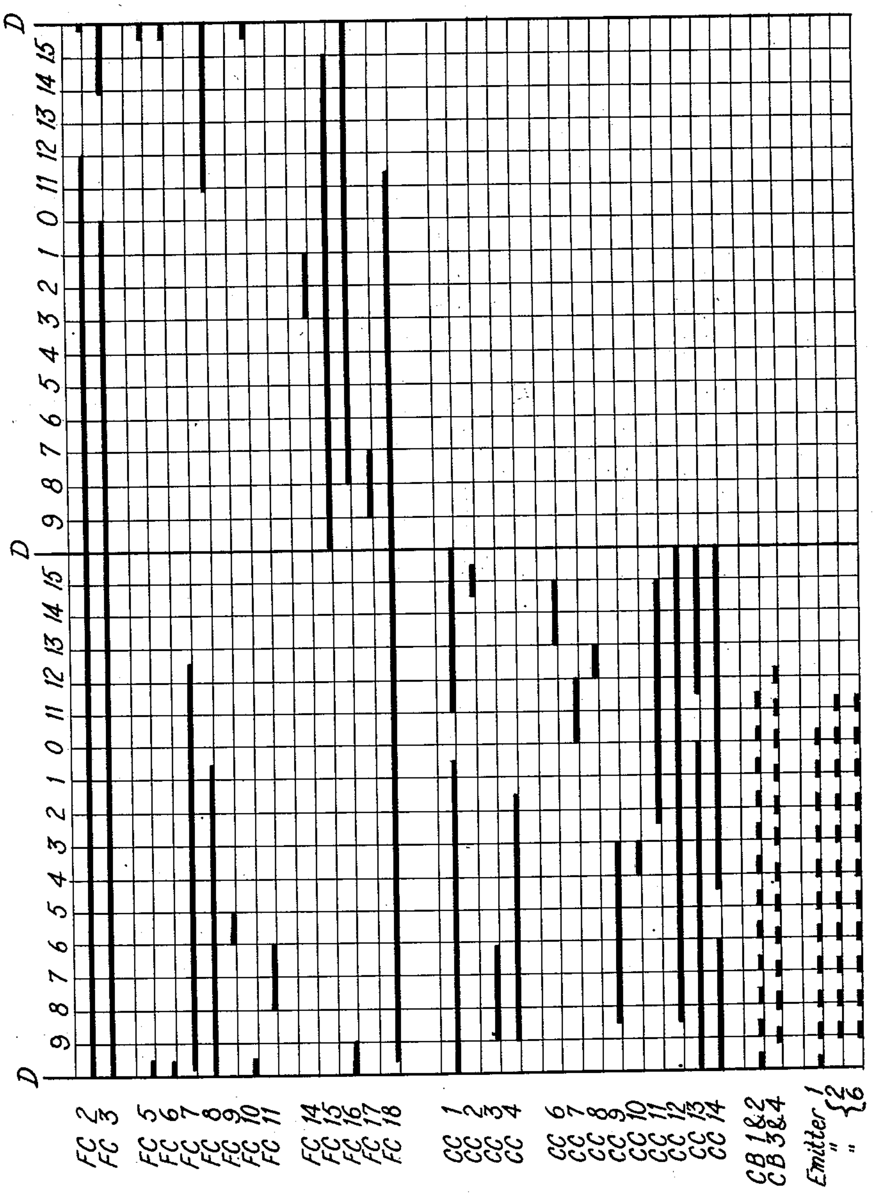

Fig. 8 is a timing diagram of the FC and CC cam contacts.

Figs. 9*a* to 9*m* inclusive, when assembled in this order, show the complete circuit diagram of the machine.

Figure 1:
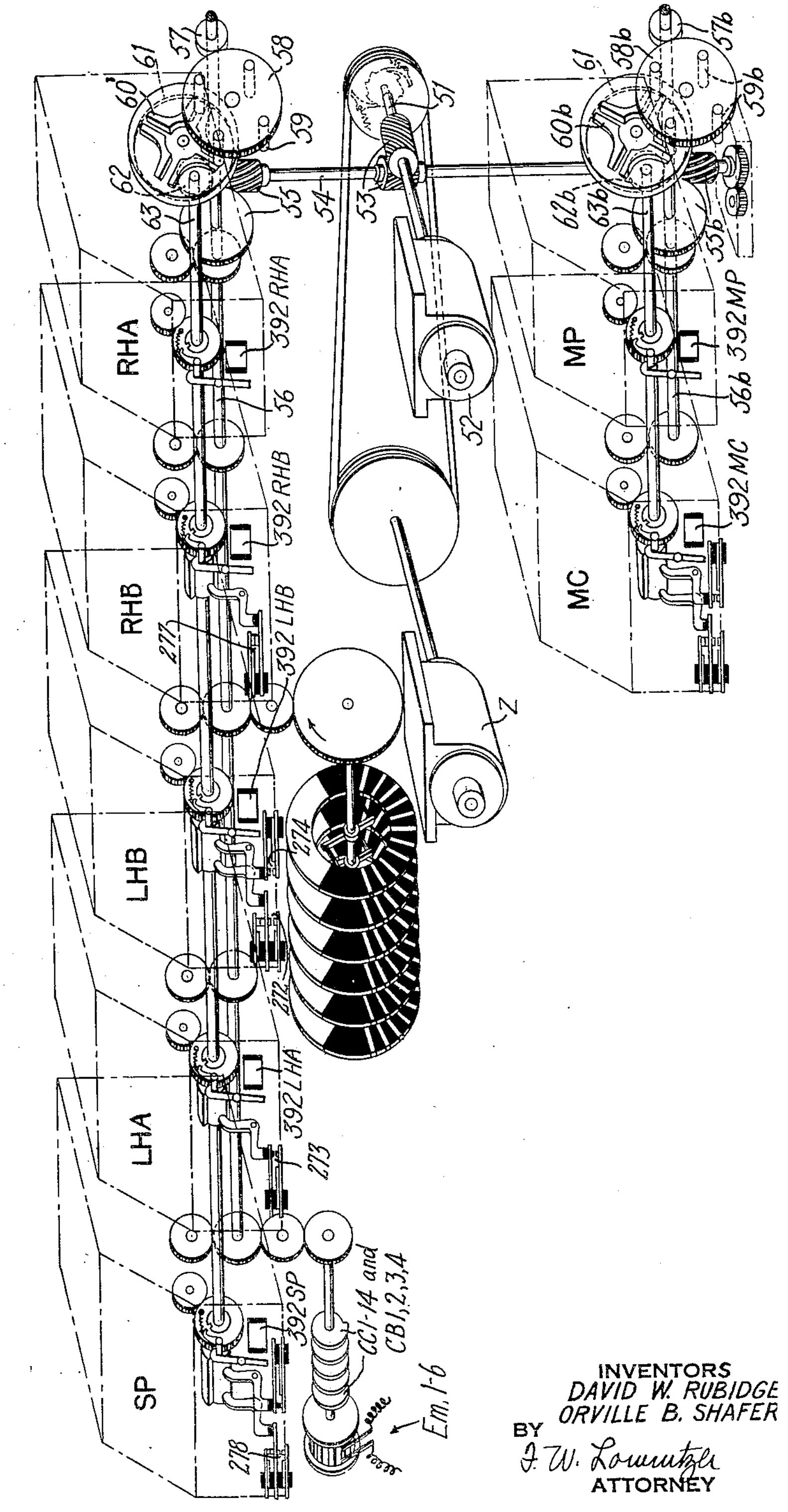

The machine is adapted to be driven by a constantly running motor Z (Fig. 1), which motor through a belt and pulley and ratchet drive, drives a shaft 51, which in turn drives an A. C. and D. C. generator 52.

Shaft 51, through worm gear drive 53, drives a vertical shaft 54 for driving the units of the upper and lower sections of the machine. At its upper end shaft 54, through worm gear 55, drives the main drive shaft 56. The various accumulators are driven from this shaft in the customary manner. The reset drive for the upper accumulators is provided as follows: Shaft 56 carries a spur gear 57, driving a gear 58 with a four-to-one drive ratio. Gear 58 has extending from it four Geneva pins 59 cooperating with the other or cross element of the Geneva, designated 60. Secured to 60 is an internal gear 61 meshed with the spur gear 62 mounted on the end of the reset shaft 63.

The accumulators are reset from this reset shaft in the customary manner by electromagnetically controlled one-revolution clutches.

The drive for the lower units of the machine is substantially the same as previously described, i. e. the shaft 54, through worm gearing 55*b*, drives the lower drive shaft 56*b*, which shaft is also used for actuating parts in the MPR, CS and CR units. A similar Geneva drive 57*b*, 58*b*, 59*b* and 60*b* is adapted to drive an internal gear 61*b*, which in turn drives a pinion 62*b*, mounted on the end of the lower reset shaft 63*b*. The lower reset shaft 63*b* is adapted to reset the MP and MC entry receiving devices by means of the usual electromagnetic one-revolution clutches.

*Card feed and card handling unit drive*

Figure 1A:
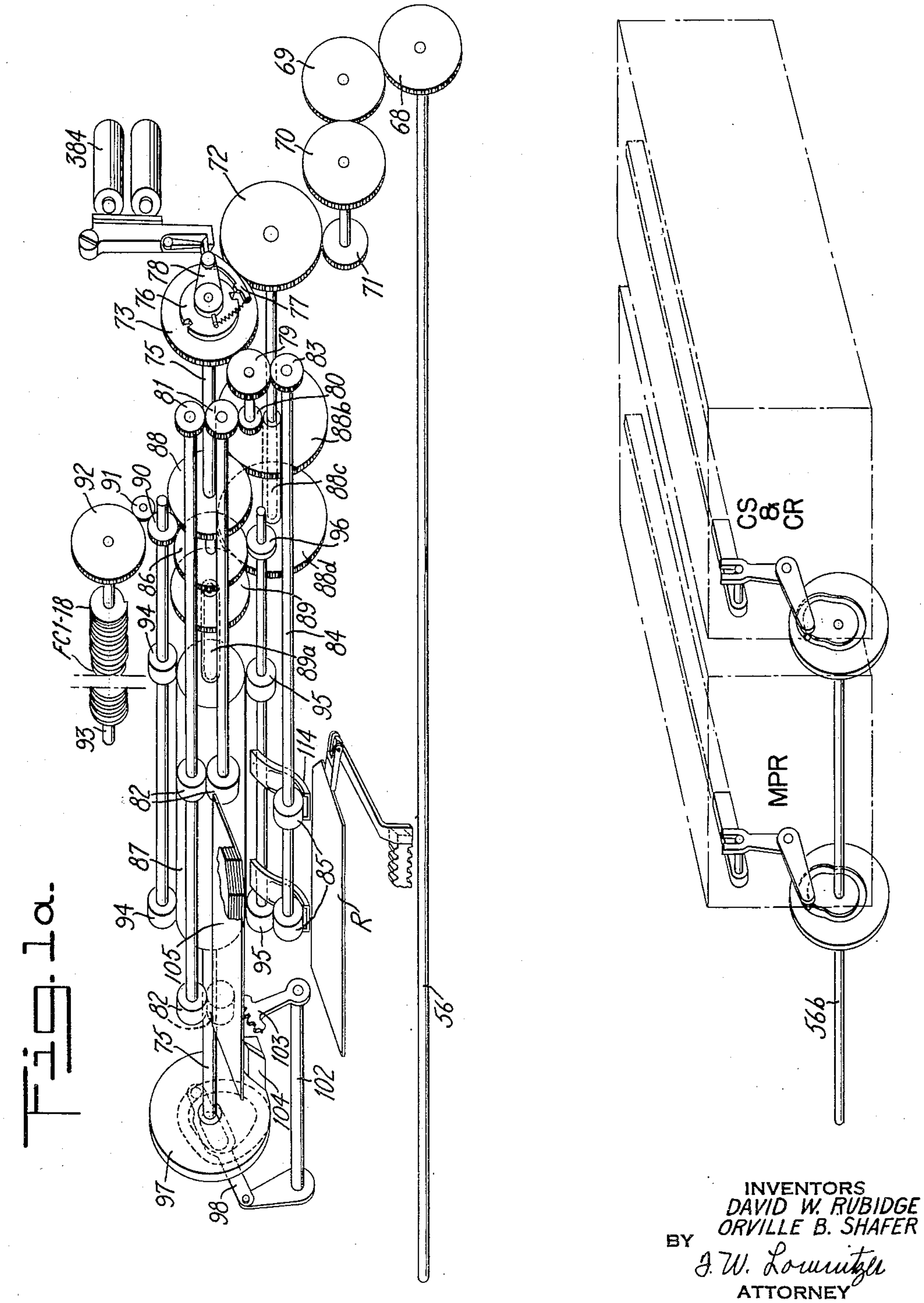

Referring to Fig. 1*a* the shaft 56 is provided with a gear 68, which through an idler gear 69 drives a gear 70, which through its shaft drives gear 71, which gear 71 in turn drives gear 72. Gear 72 in turn drives a gear 73 revolubly mounted on shaft 75. Gear 73 has fixed to it one element 76 of the one-revolution clutch, the complemental part of which comprises a pawl 77, carried by an arm 78, which is fixed to shaft 75. The one-revolution clutch is of the customary electromagnetic type used in tabulating machines and with this one-revolution clutch engaged by the energization of its card feed clutch magnet 384, the shaft 75 will rotate in unison with gear 73, and with the one-revolution clutch disengaged, 73 will continue its rotation and shaft 75 will remain stationary.

Gear 73 also drives an intermediate gear 79, which is fixed to the gear 80, which drives a train of gears 81 and which in turn drive the card feed rolls 82 of the machine. Such card feed rolls 82 are constantly rotating feed rolls. Also in train with gear 79 is a gear 83, which gear constantly drives a drag roll shaft 84, having fixed thereon a pair of drag rolls 85.

As shown, the one-revolution element clutch 76 is provided with two notches and the arrangement of this clutch is such that whenever the pawl 77 is engaged, the element 78 of the one-revolution clutch will make one complete revolution. The one-revolution clutch pawl 77 can be engaged in either of the two notches of the clutch element 76, which relation of the clutch members is provided because after the machine has been started and is running on a run of cards one cycle is required to traverse the card and carry it past the sensing brushes and another cycle is required to deliver the card to the punching section of the machine.

Fixed to shaft 75 is a gear 88, which in turn drives a gear 88*b* mounted on the sleeve 88*c*, which in turn drives a gear 88*d*. Gear 88*d* in turn drives gear 89, which is fixed to the sleeve 89*a* revolubly mounted on shaft 75 but fixed to the card transfer and contact cylinder 87. Gears 88 and 89 have a slightly different diameter, and gears 88*b* and 88*d* also have a slightly different diameter. This slight difference in diameter provides for the slight creeping advance of card transfer and contact cylinder 87, (see also Fig. 3) as the card handling operations ensue and serves to prevent sensing occurring at the same spot or spots on successive card cycles.

*Drive to intermittently actuated FC contacts*

Gear 86 is fixed to shaft 75 and drives a gear 90, which gear in turn drives an idler gear 91 driving a gear 92 fixed to cam contact shaft 93. Shaft 93 has secured upon it a number of cams for actuating the FC1–18 group of cam contact devices of the machine. Such cams are so driven that they make one revolution per card feed cycle in contradistinction to a machine cycle. Fixed to the shaft of gear 90 are card feed rolls 94, which are spring-pressed into contact with card transfer and card contact cylinder 87. Similar spring-pressed card feed rolls 95 also cooperate with the transfer and contact roll 87 and such rolls are driven by the gear 96 in train with gear 86. Rolls 94 and 95 are preferably made of insulating material.

*Card picker drive*

Shaft 75 has secured to it a box cam 97 with which a follower 98 cooperates. The follower rocks a rock shaft 102 carrying a gear sector 103, which is in engagement with a picker block 104. Upon engagement of the one-revolution clutch the picker is called into action to withdraw a single card 100 from the magazine 105 (Fig. 3) and advance this card into the bite of rolls 82. These rolls in turn forward the card to the card transfer and contact roll 87. Intermediate rolls 82 and the transfer cylinder 87 there is provided an advance or X brush sensing position. The X brush 106 cooperates with the combined contact and card guide plate 107. A curved card guide is provided around the transfer cylinder and the advancing card is carried around by the forward rotation of the transfer cylinder and by the rotation of rolls 94 to traverse the main card sensing brushes generally designated 109 in Fig. 3. Also in cooperation with the card is a pivoted card lever 111 adapted to operate the usual card lever contacts 112.

After the card has been sensed by the main sensing brushes 109 it is advanced between guiding members 114 and 115 by the cooperation of feed rolls 95 with cylinder 87. While between these members it is advanced by drag rolls 85, which extend downwardly into recesses of the lower members 114, as shown in Fig. 1*a*. This arrangement provides for the feeding of the card and the advance of the card after it has been released by the rolls 95 so that the card may be delivered into the tray of the punching section of the machine. The drag rolls 85 deliver the card under the guiding member 117 and after the card has been freed from the drag rolls the card is flipped down into the tray of the punching section of the machine. The location of this tray is generally designated at 118 in Fig. 3, and the position of the card in this tray is indicated at R in Fig. 1*a*. A card lever 119 (Fig. 3) is also provided and adjacent the tray for closing card lever contacts 120 when the card is lodged in the tray of the punching section of the machine.

With the traverse of the card past the main sensing brushes 109, the amount of the multiplier and the preset multiplicand selecting perforations will have been read from the card. The MP receiving device and MC receiving device and the LHA, LHB and RHA, RHB and SP accumulators are of the usual type as customarily used in record controlled accounting machines and are provided with electromagnetically operated clutches for effecting the digit entries.

The machine to which the present invention is incorporated as illustrative of one embodiment is shown and described in the patent to G. F. Daly, No. 2,045,437, and only so much of the preceding description of the operation of the machine and that to follow are given to understand the present invention.

*Circuit diagram*

In the following description of the machine the different operations will be coordinated so that the sequential operations will be more clearly understood.

In setting the machine into operation, prepunched cards 100 are first placed in the card magazine 105 of the machine. The motor Z being in continuous operation drives the A. C. and D. C. generator 52 and the D. C. section 52DC (Fig. 9*m*) supplies direct current to the D. C. lines 381 and 382. Alternating current impulses are supplied by the A. C. section 52AC (Fig. 9*a*) to the ground and a bus 383.

The circuits to start the machine into operation, a description of which follows, are the same as in the aforesaid Patent No. 2,045,437.

The start key is depressed to close start key contacts 275 (Fig. 9*l*) which complete a circuit from the line 381, the start key contacts 275, through R4 relay coil through R12-2 contacts now closed in a manner to be later described, through transfer contacts R9A, now normal, through cam contacts FC2, to line 382. A stick circuit is established back to line side 382 through stick relay contacts R4B, and cam contacts FC8 now closed.

Energization of relay R4 closes relay contacts R4A (Fig. 9*m*) and establishes a circuit from line 381, through transfer relay contacts R8B now normal, card feed clutch magnet 384 (see also Fig. 1*a*), cam contacts FC6 now closed, stop key contacts 276, relay contacts R15—1 now closed, R4A relay contacts now closed, the punch rack contacts P1 now closed, to the line side 382.

Figures 2, 2B:
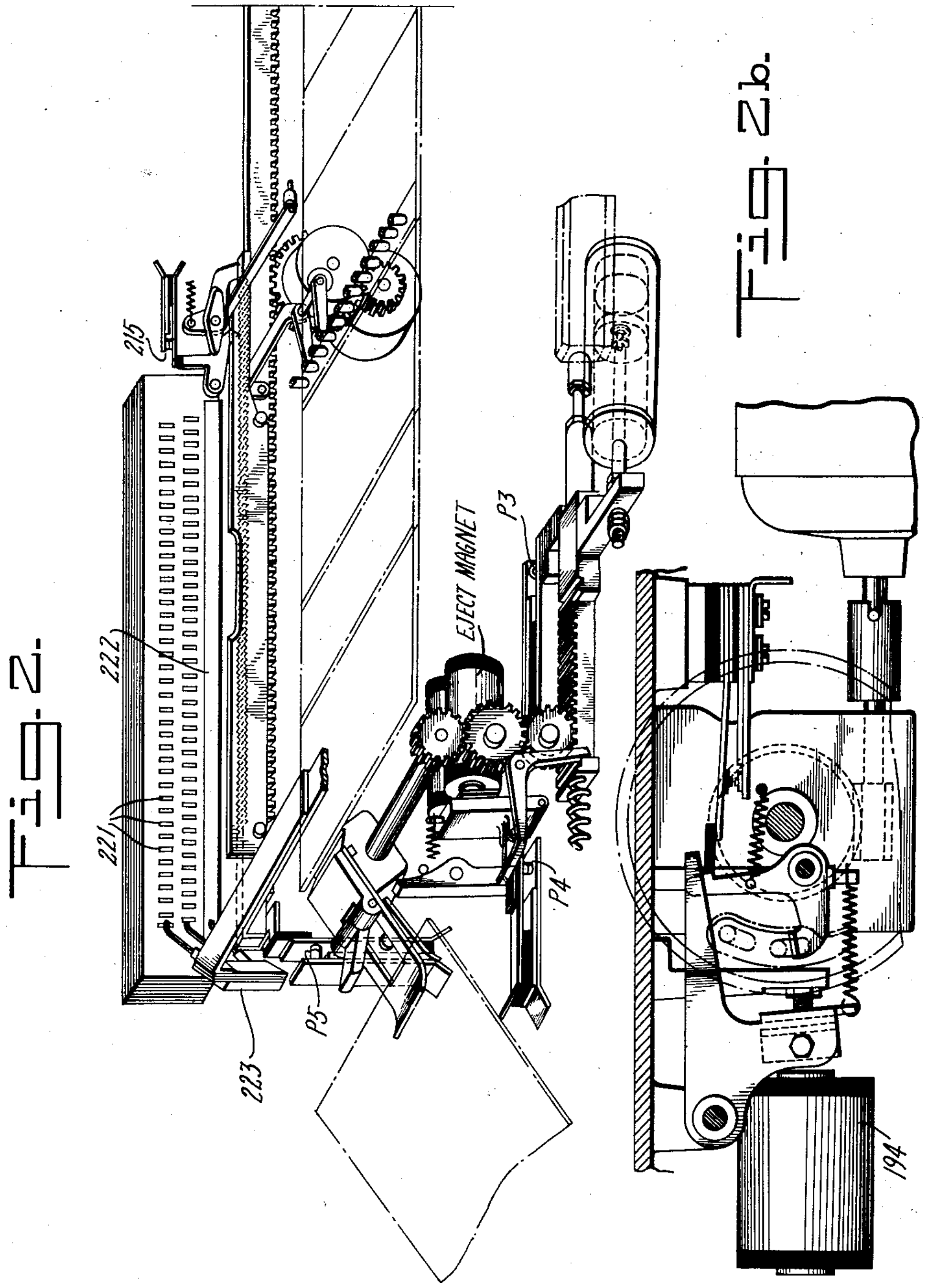
Figure 2A:
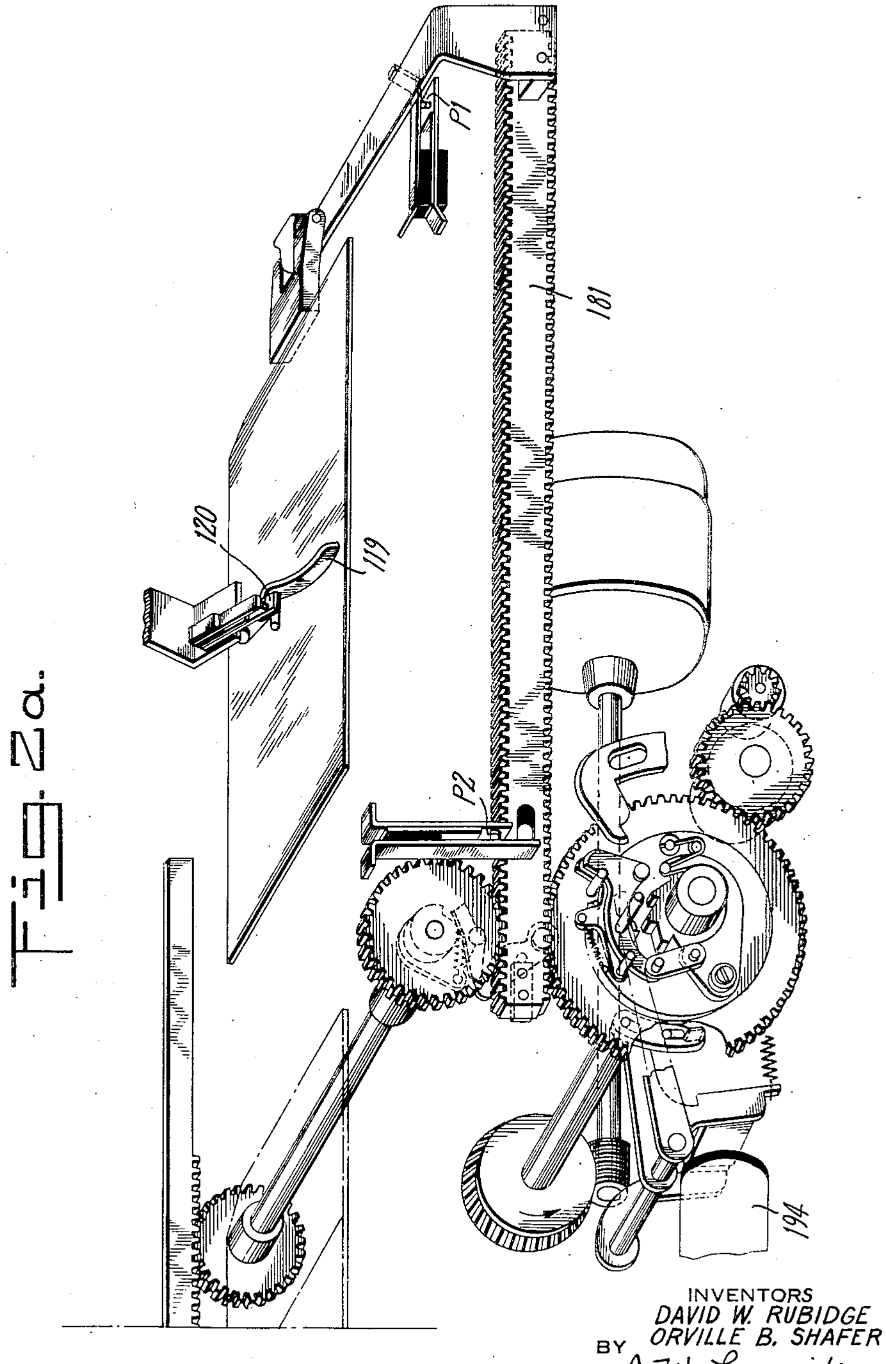

In the present machine the start key must be held depressed for the first two card feed cycles starting up upon a run of cards. Alternatively, it may be depressed and released and then depressed a second time. In the usual manner starting is prevented until the feed rack 181 (Fig. 2*a*) of the punch is in the right hand position. This is provided for by contacts P1. The first complete card cycle upon starting up the machine will advance the first card to a point where the X (first extra index point position of the card) will be in alignment with the special brush 106 in which position the "9" index point position of the card will be about ready to pass under the brushes 109. At the beginning of the second card feed cycle the card traverses the brushes 109 and the multiplier amount represented in columns 40, 41, and 42 is entered into the MP receiving devices and the multiplicand reading brushes 109 analyze the perforations in the columns 43-47 which in the present example designate the models of automobiles to be manufactured in a certain period to thereby pick up the related multiplicand amount selecting relays to select the preset, multiplicand amounts, as will be subsequently described. At the end of the first card feeding cycle the card lever contacts 112 (Fig. 3) will be closed by the card, causing energization of the R10 relay coil (Fig. 9*l*) by a circuit from line 381, relay R10, contacts 112, to line 382.

At the beginning of the second card feed cycle the closure of cam contacts FC11 will energize R9 relay magnet through a circuit including card lever contacts 112. Relay magnet R9 will transfer its contacts R9A, setting up a holding circuit through cam contacts FC2, and will also close relay contacts R9B to provide a further holding circuit through the card lever contacts 112. These two holding circuits alternate in maintaining relay magnet R9 energized as long as cards continue to feed from the magazine 100. The relay magnet R10 is also provided with a holding circuit, which extends through card lever contacts 112 or serially through relay contacts R9A and FC2 cam contacts. FC2 contacts make at a time which overlaps the time card lever contacts 112 open between cards.

Energization of relay R10 will cause transfer of its contacts R10B (Fig. 9*a*) to the reverse position shown, thereby supplying current from generator 52AC to the distributor circuit breaker contacts CB1, CB2, CB3, CB4, to the contact roll 87 of the analyzing brushes 109.

After the first card has traversed the brushes 109 it is fed into the punching unit of the machine and upon its arrival there causes the closure of contacts 120 (see Fig. 2*a*) which cause the energization of the R8 relay (Fig. 9*l*) by an obvious circuit. The transfer of the R8B contacts from the position shown establishes a circuit from the line 381, relay contacts R12—4 now closed, cam contacts CC6, punch trip magnet 194 and through punch contacts P1 to line 382. The contacts R12—4 are controlled by relay magnet R12 which is energized upon closure of the last column contacts P5 in the punching unit. These contacts P5 are closed whenever the card advancing carriage of the punch is just beyond the last column position, which position it occupies when the operation of the entire machine is started so that upon starting R12 relay is energized and its contacts are in shifted position.

When cam contacts CC7 close a circuit is completed from line 381 through the pickup winding of the R17 relay (Fig. 9*m*, top right) through cam contacts CC7 and eject contacts P4. This relay closes the R17—2 contacts and a circuit is completed from line 381 through the holding coil of the R17 relay through the R17—2 relay contacts and the P1 punch contacts to line 382.

*Reset of LHA, LHB sections*

When cam contacts CC2 close a circuit is closed from line 383, through CC2 cam contacts (Fig. 9*a*), R83—4 relay contacts now normal, R13A relay contacts now closed, to the 392 LHA and the LHB reset magnets to ground. Thus, during the second machine cycle the LHA and LHB accumulator sections are reset (see Fig. 6*a*) but differing from the multiplying machine in the aforesaid Daly Patent No. 2,045,437 multiplying operations are not performed in subsequent cycles, there occurring at this time preset multiplicand entry cycles and successive transferring cycles to be later described.

During the reset of the LHA and LHB sections, LHB reset contacts 272 (Fig. 9*m*) close and LHA reset contacts 273 close to complete an obvious circuit to the pickup winding of R13 relay, which latter is held energized through the R13B hold contacts, RHB reset contacts 277 normally closed, and P2 punch rack contacts. P2 punch contacts remain closed until the punch rack 181 has completed its traverse to the left. The R13A contacts (Fig. 9*b*) open to prevent a repeat reset, as is well known.

*Entry into M. P. receiving device*

The entry circuits will now be traced. Current flows from the A. C. line 383 (Fig. 9*a*) through CB1—4 circuit breaker contacts, relay contacts R10B now transferred, through cam contacts FC7 which close during the entry part of the cycle, card contact roll 87, through the brushes 109MP pertaining to the three denominational orders of the multiplier amount sensed in columns 40, 41, 42 to the brush plug sockets of the plugboard 385. Plug connections are made from such brush plug sockets to plug sockets connected to the right hand transfer contacts 386 (not employed in the present invention), to the multiplier magnets 390MP. The return circuit for magnets 390MP is through a closed switch 391, the relay contacts A2, to ground. The A relay is not involved in the present machine and its purpose is described in the Daly Patent No. 2,045,437.

*Relay setup from multiplicand representing card columns*

Figure 4:
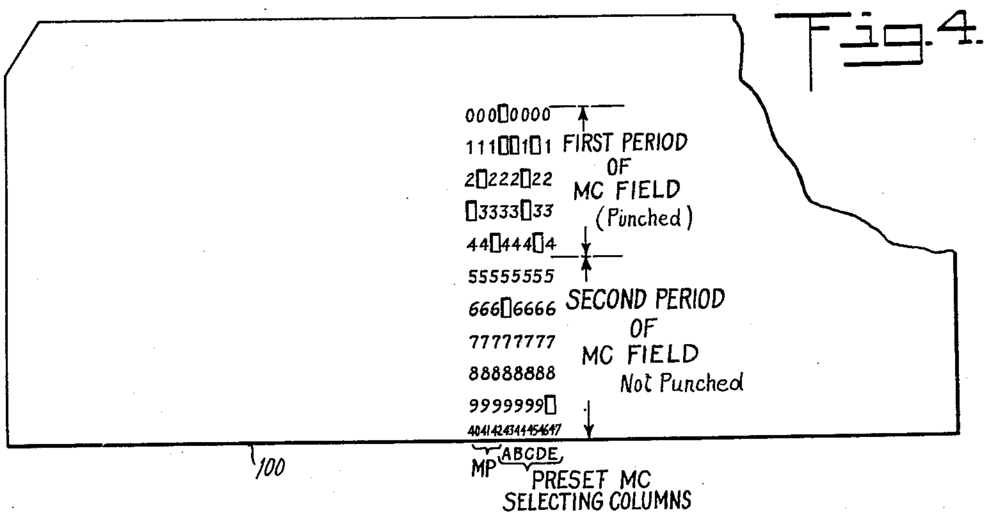
Fig. 4 is an illustrative card used to control a multiplying computation.

From Fig. 4 it will be noted that for purposes of illustration five columns 43–47 contain one or more perforations in each column to represent model numbers. In each column there are eleven index point positions and for five columns there are obviously 55 possible model number representing perforations. Therefore, this field does not represent a multiplicand amount as in previous record controlled multiplying machines but the differentially located perforations in said card columns represent and select arbitrary numbers, or multiplicand amounts.

Figure 9A:
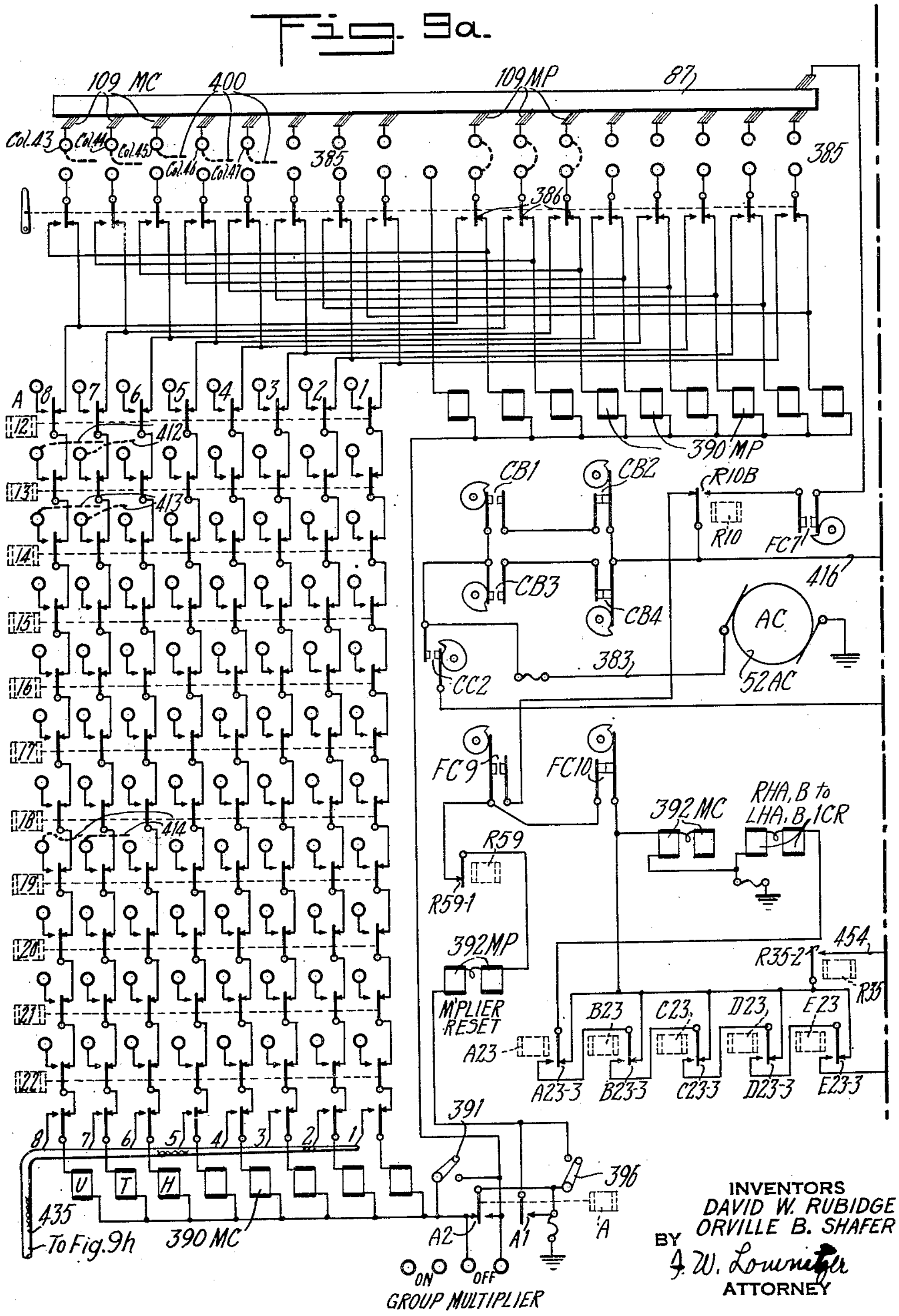
Figure 9B:
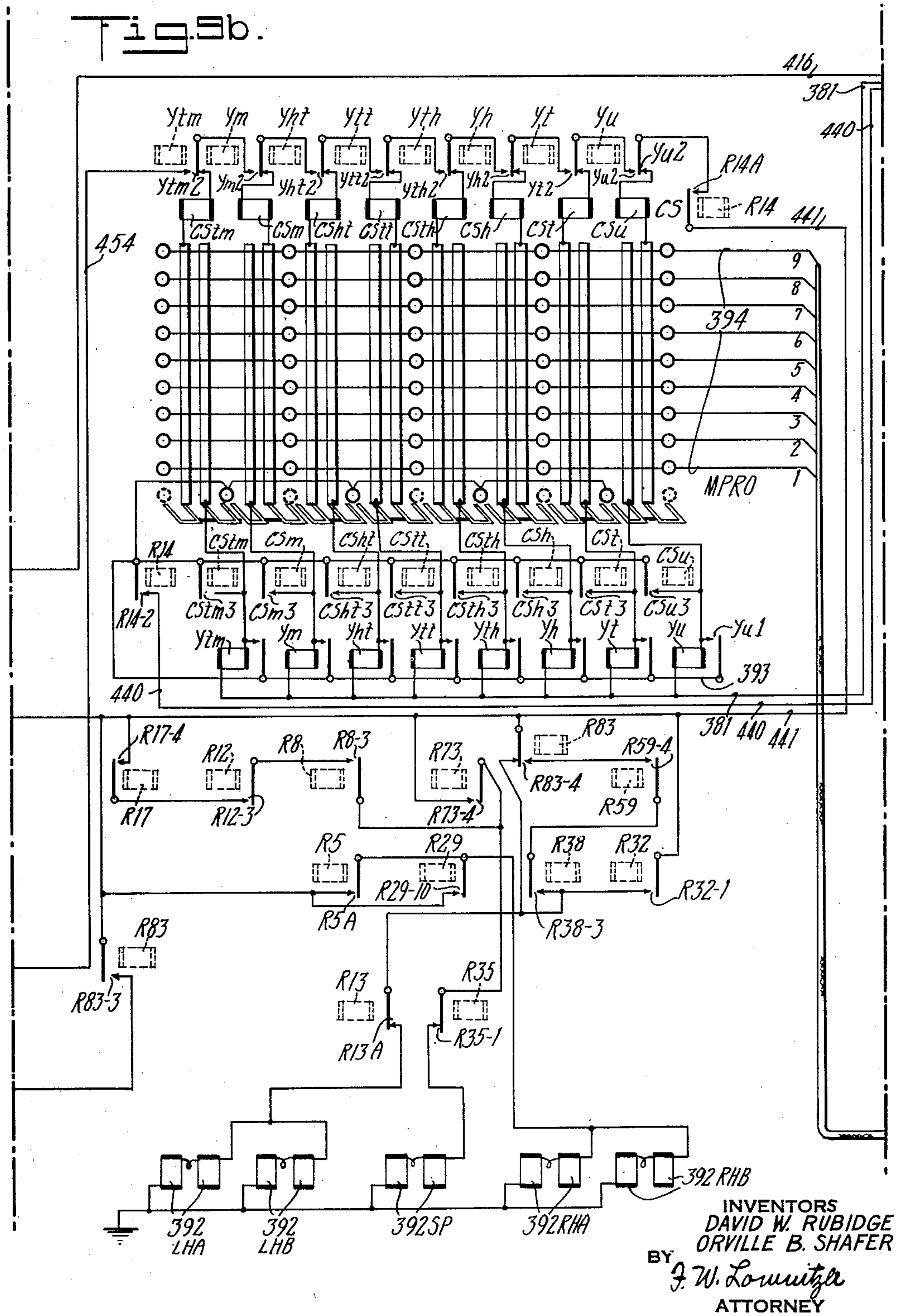
Figure 9C:
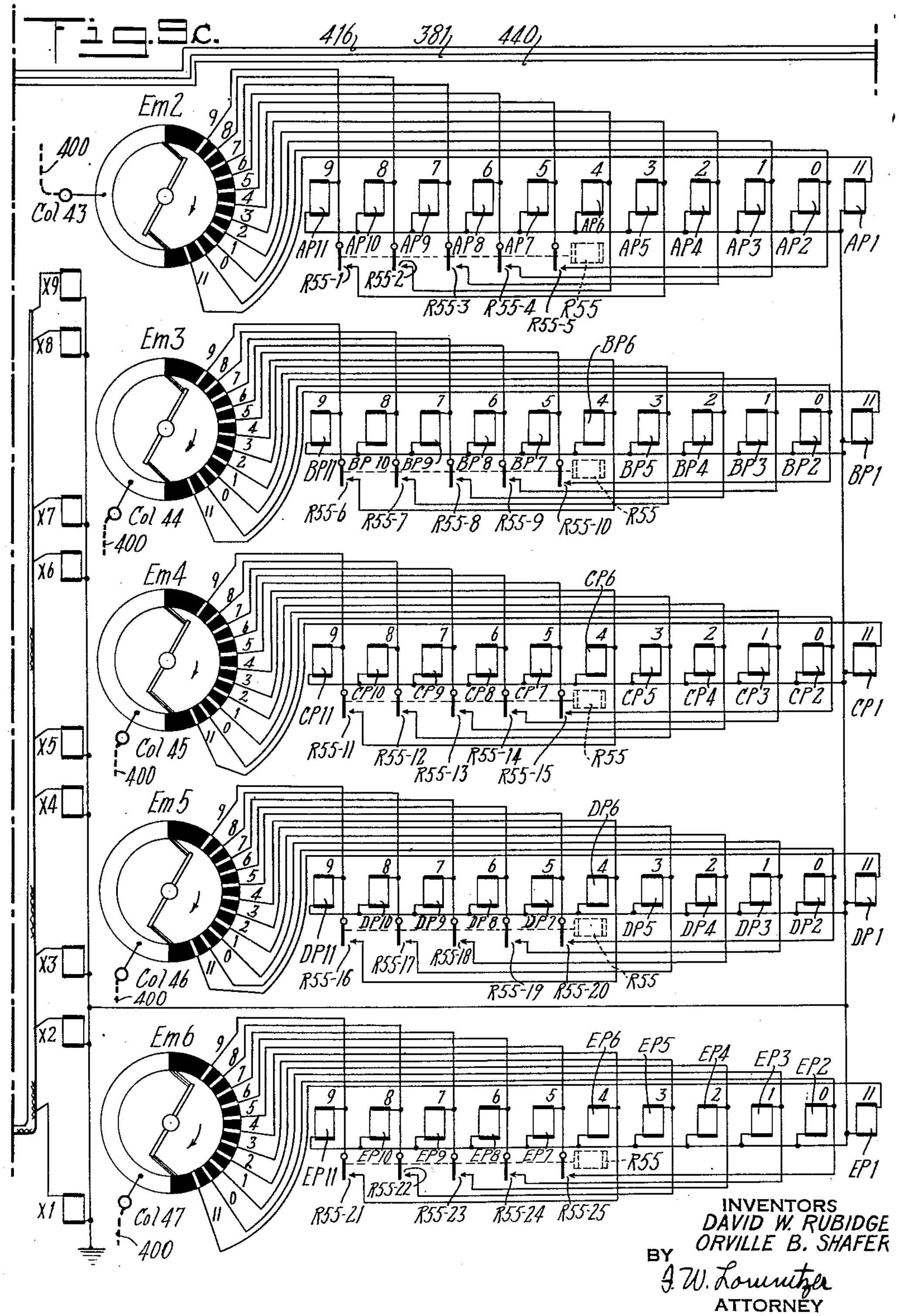

Therefore, distinguishing from previous multiplying machines of this type the entry is not made from such card field to a multiplicand receiving device but the representation is set up in one or more of the pickup coils of 55 relays shown in Fig. 9*c* and are designated AP1–AP11 associated with column 43; relays BP1–BP11 associated with column 44; CP1–CP11 associated with column 45; DP1–DP11 associated with column 46; and EP1–EP11 associated with column 47. Associated with each group of relays 1–11 is an emitter E*m*2 to E*m*6 which emits timed impulses to the pickup windings of said relays as the corresponding index point positions are being analyzed by the multiplicand analyzing brushes 109 (Fig. 9*a*). Since there are five card columns there are five of such emitters which have the timing shown in Fig. 8.

The impulse circuits to the multiplicand analyzing brushes 109 are as previously described and from each of said multiplicand analyzing brushes 109MC there is a related plug connection 400 (Figs. 9*a*, 9*c*) to a plug socket 401 of the associated emitter. Contact points of each emitter have related wire connections to the associated pickup winding of the associated group of 1–11 relays. Obviously, upon the analysis of an index point position the corresponding relay will be energized, the return circuit being to the ground. Thus, upon the analysis of the MC perforations the pickup windings of the five groups of relays are selectively energized.

The five groups of pickup coils have five groups of holding coils shown in Fig. 9*l*. To hold the energization of the relays each pickup winding closes its respective "4" hold contact (see Fig. 9*l*, lower left side); thus completing the holding circuit from the line 381, through the hold coil, the respective "4" hold contact, through cam contacts FC18 to line 382. Cam contacts FC18 are timed to hold such relays energized until the middle portion of the second machine cycle of a card feed cycle, the timing of such contacts being shown in Fig. 8.

*Transfer to utilization relays*

Figure 9D:
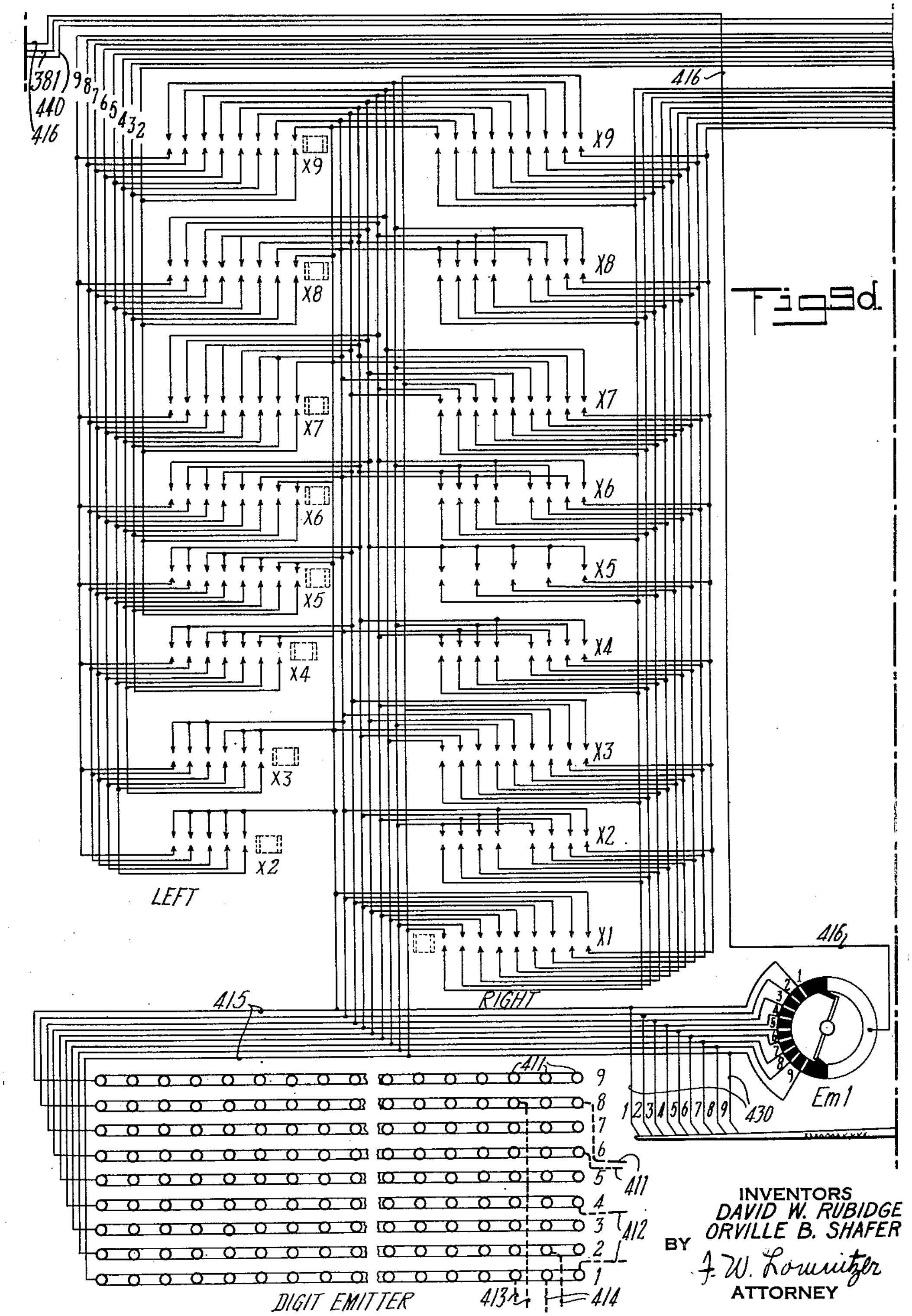
Figure 3E:
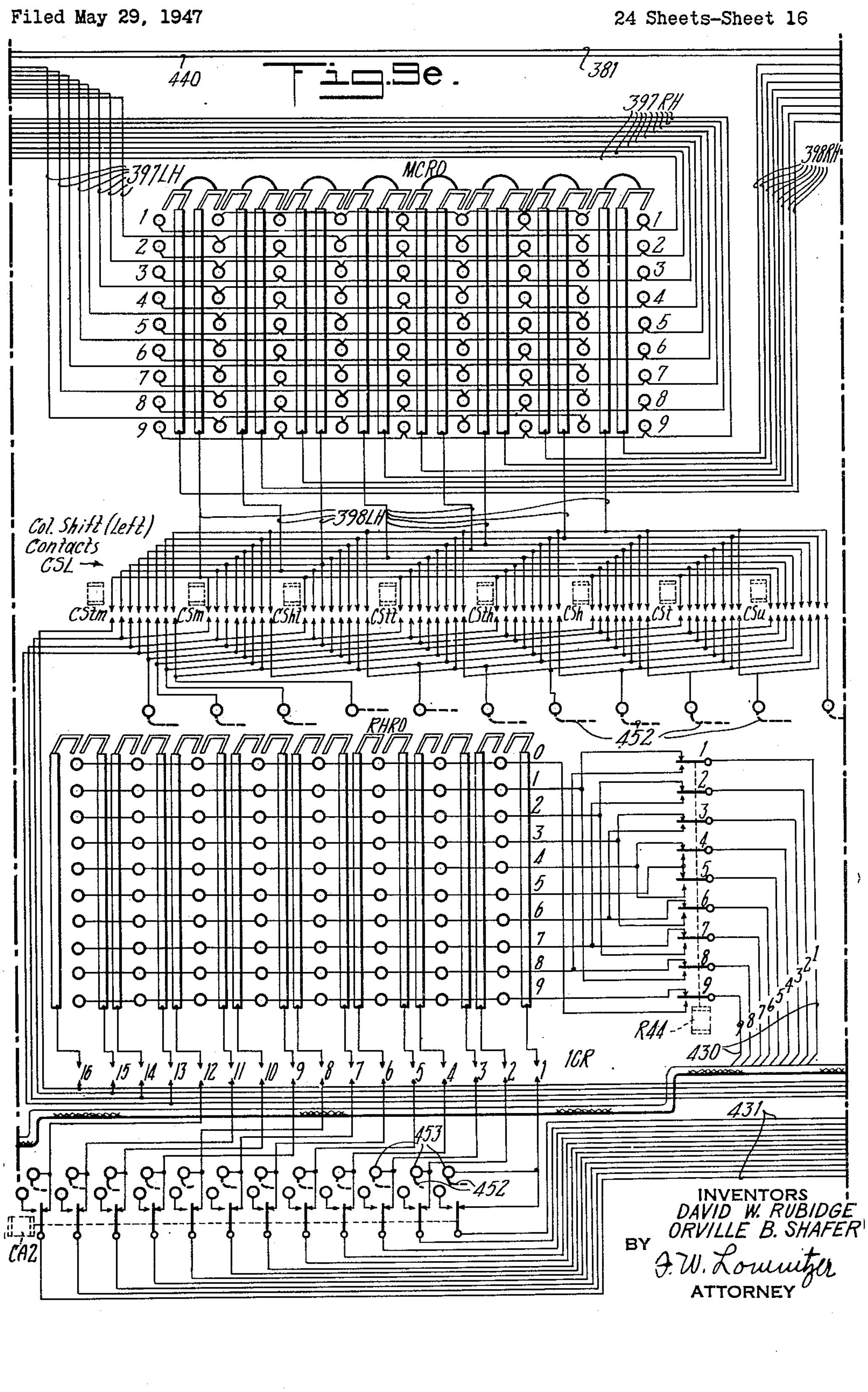
Figure 9F:
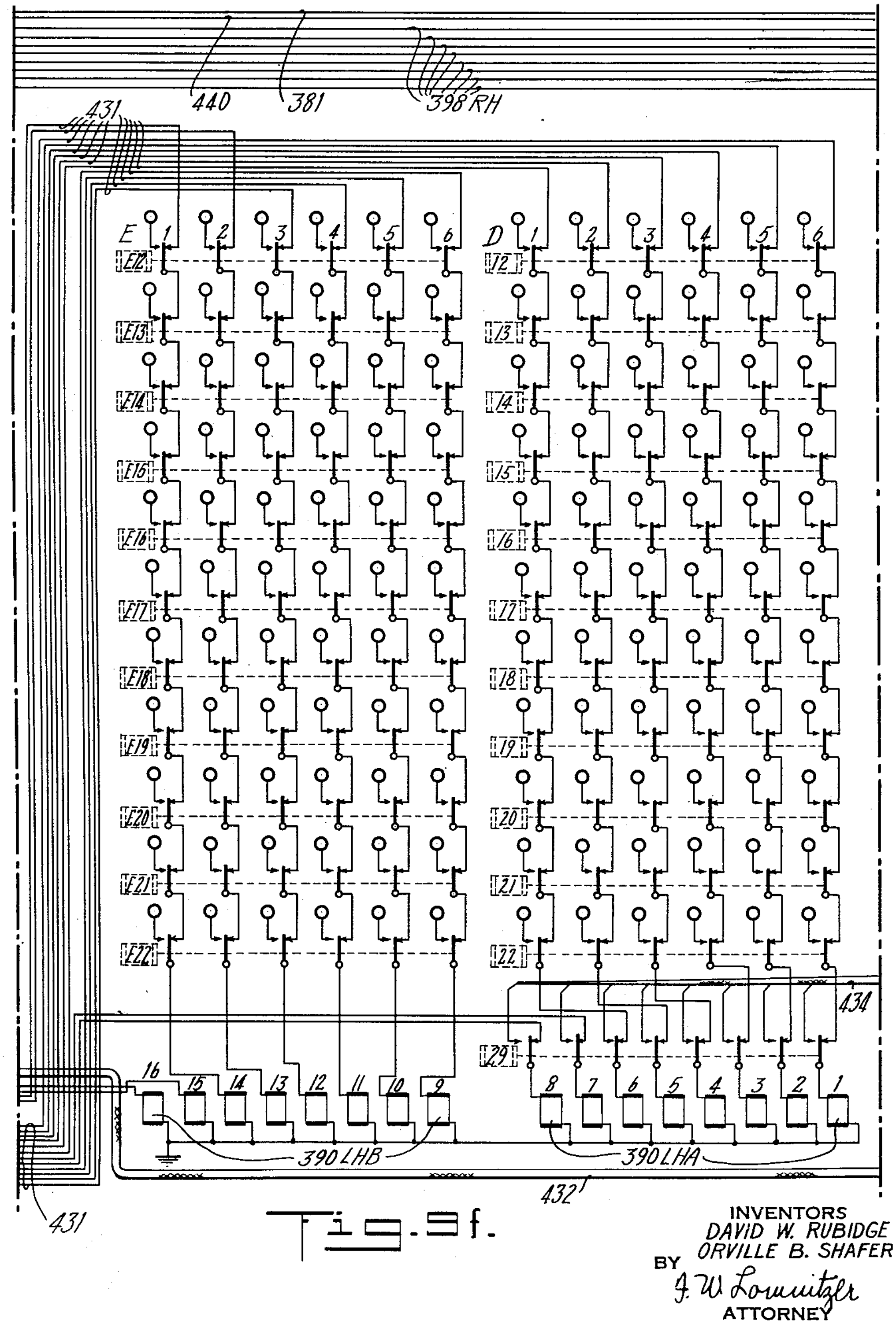
Figure 9:
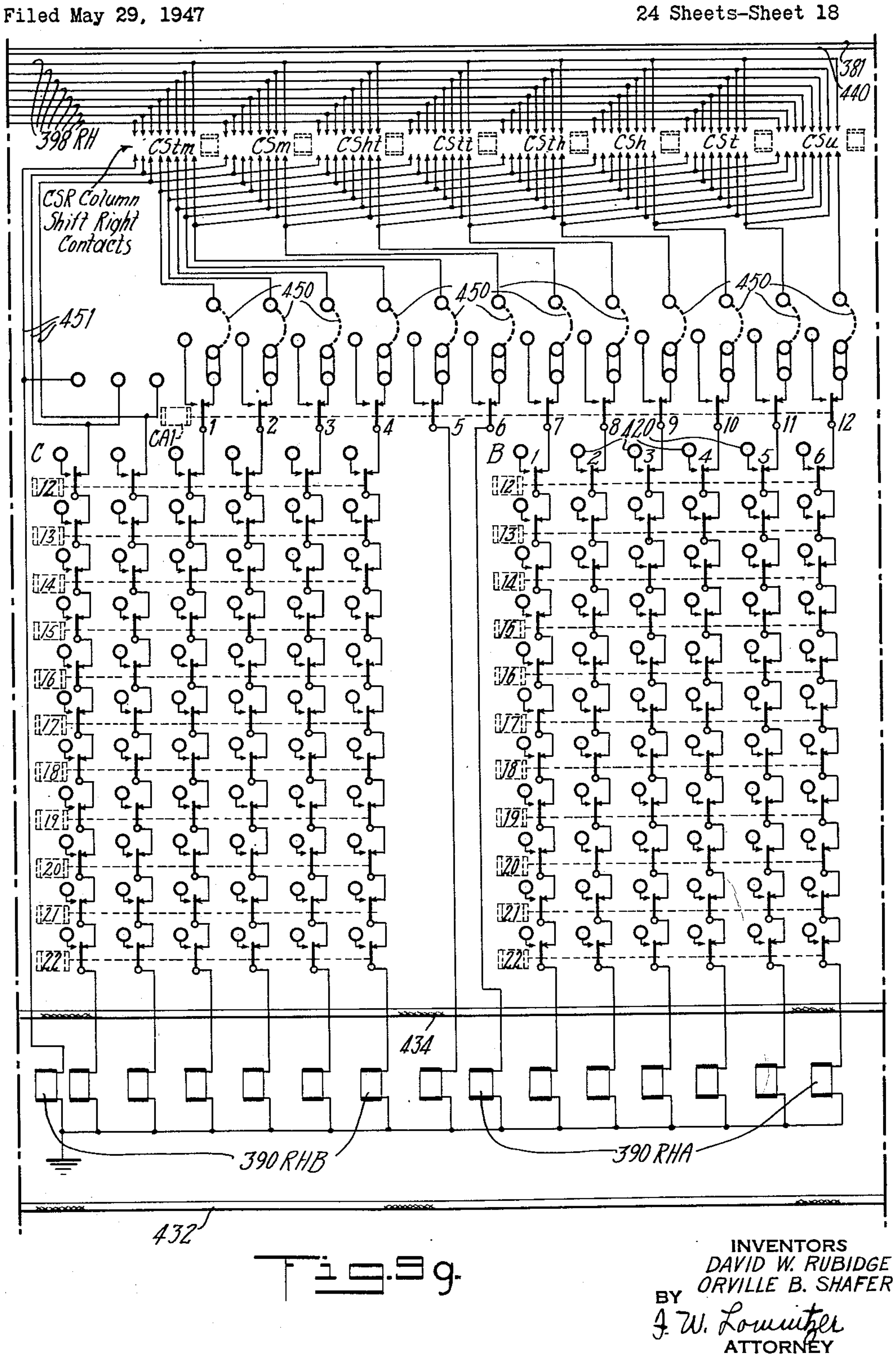
Figure 9H:
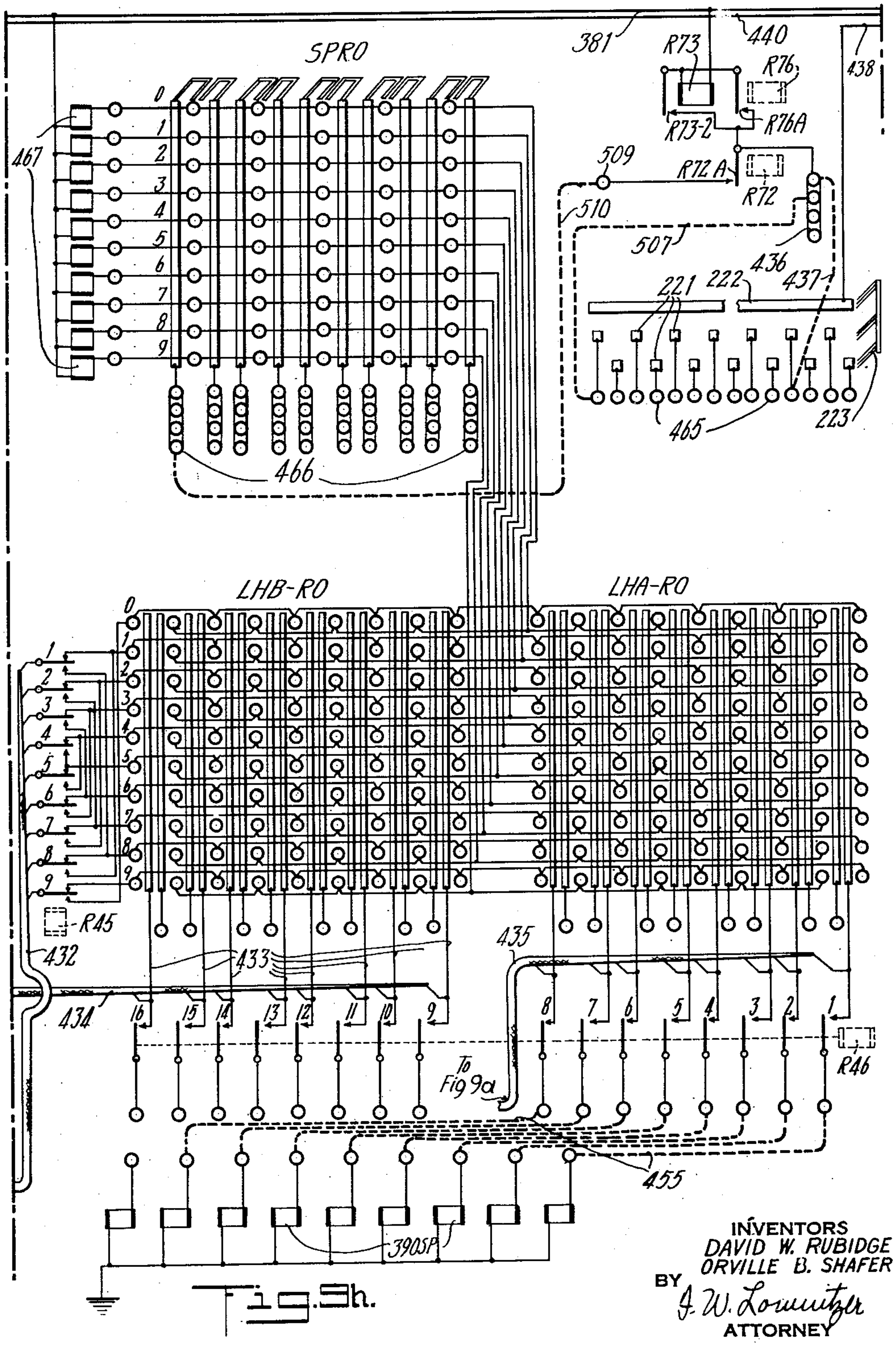
Figure 31:
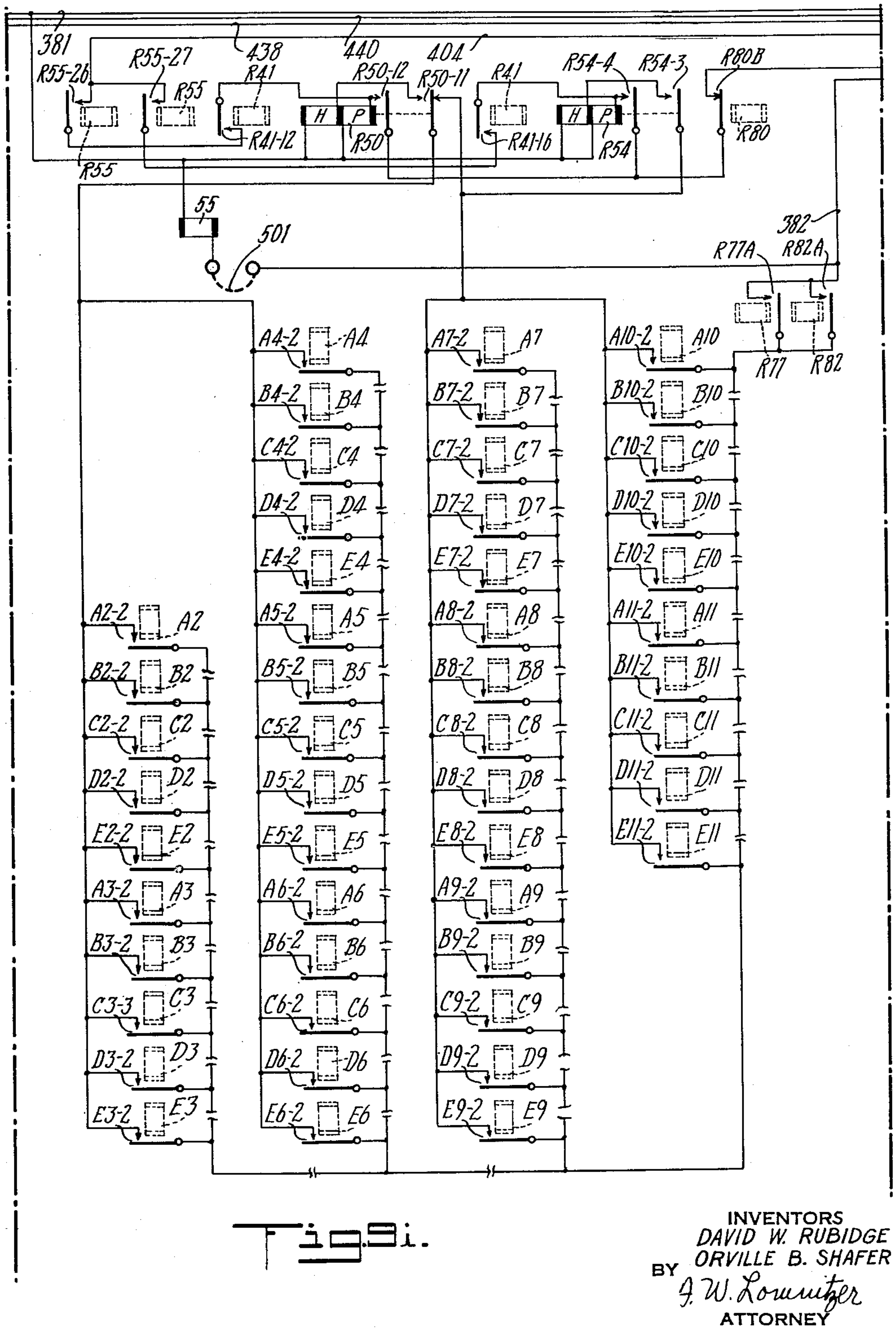
Figure 9J:
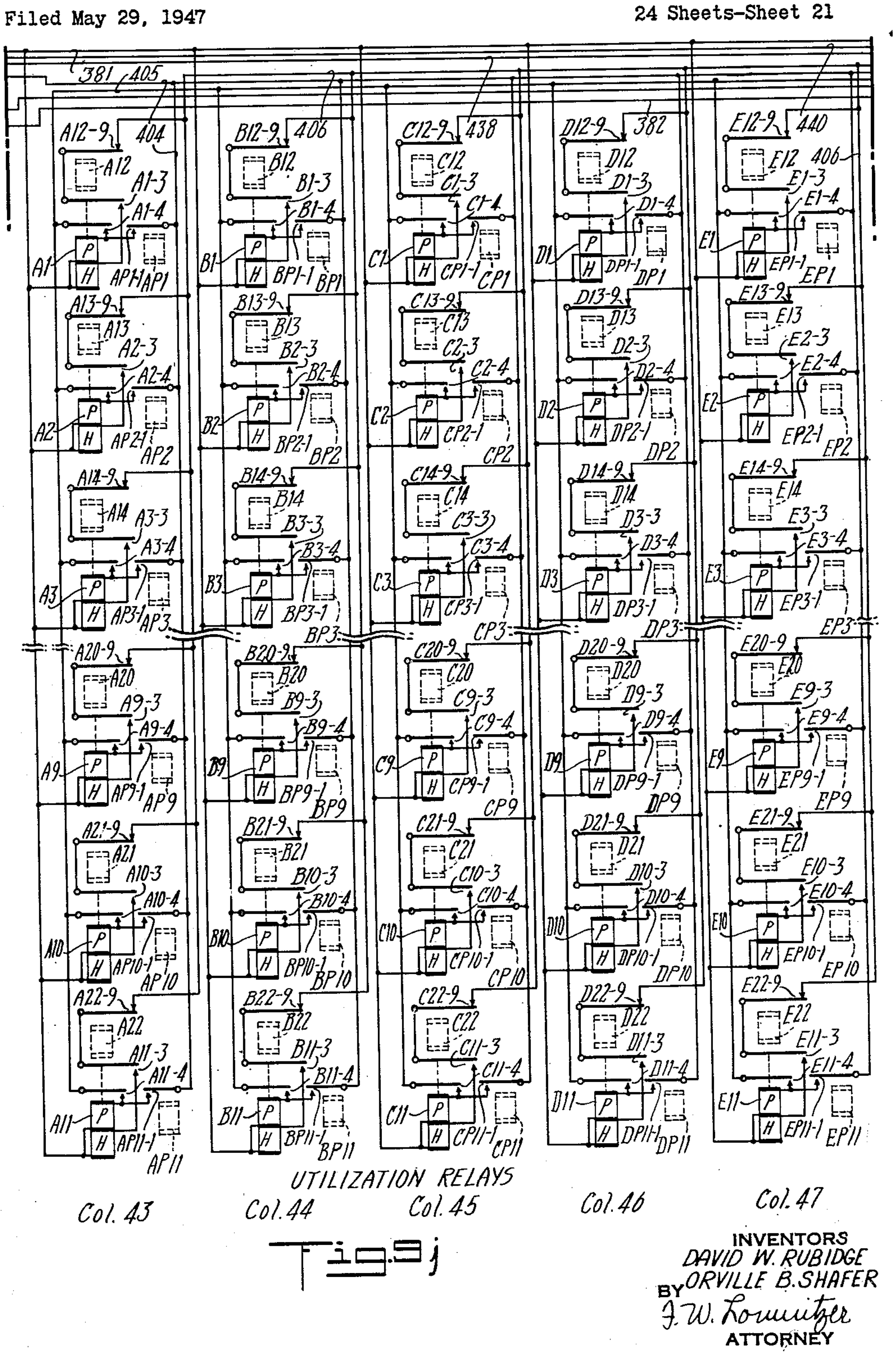
Figure 3K:
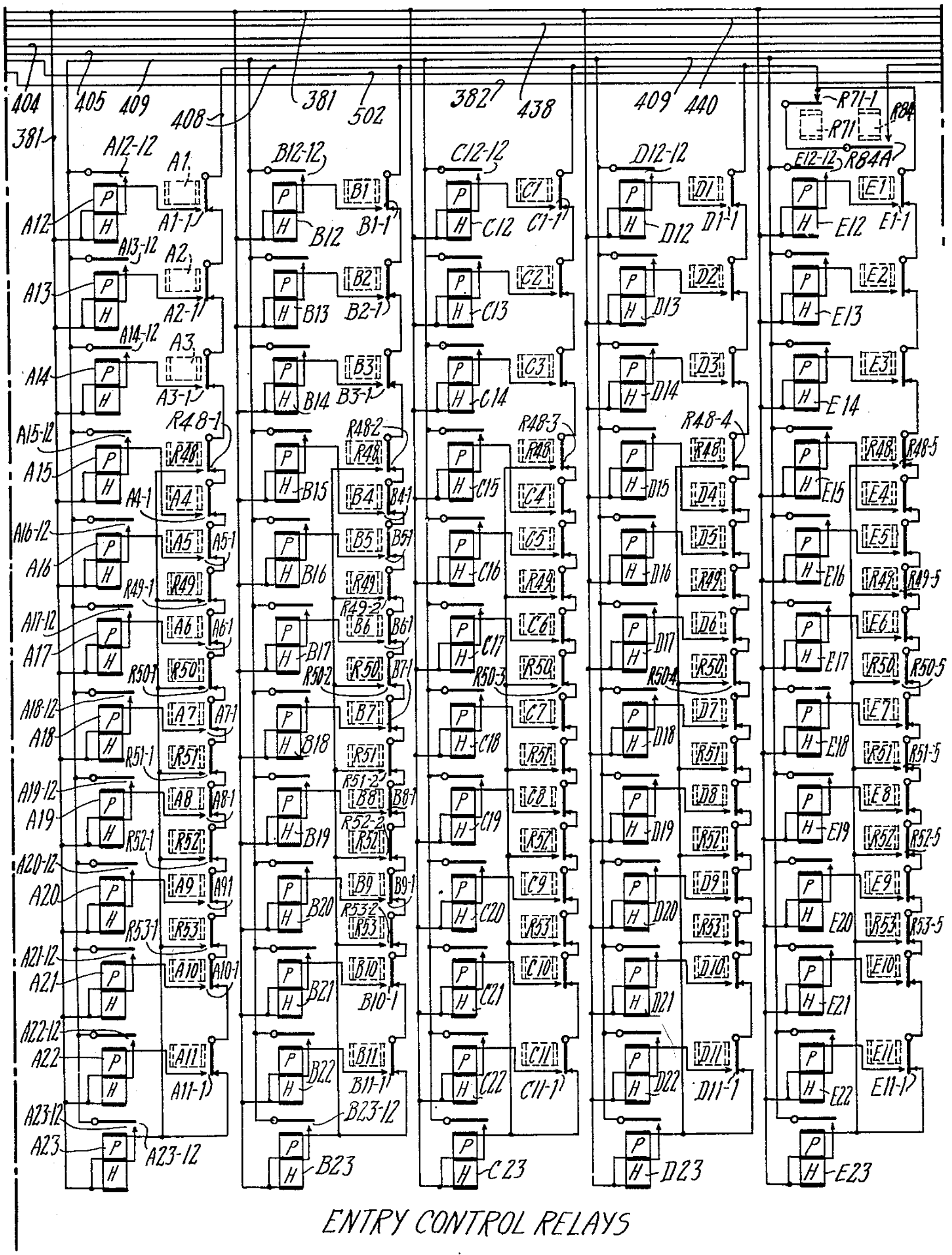
Figure 31:
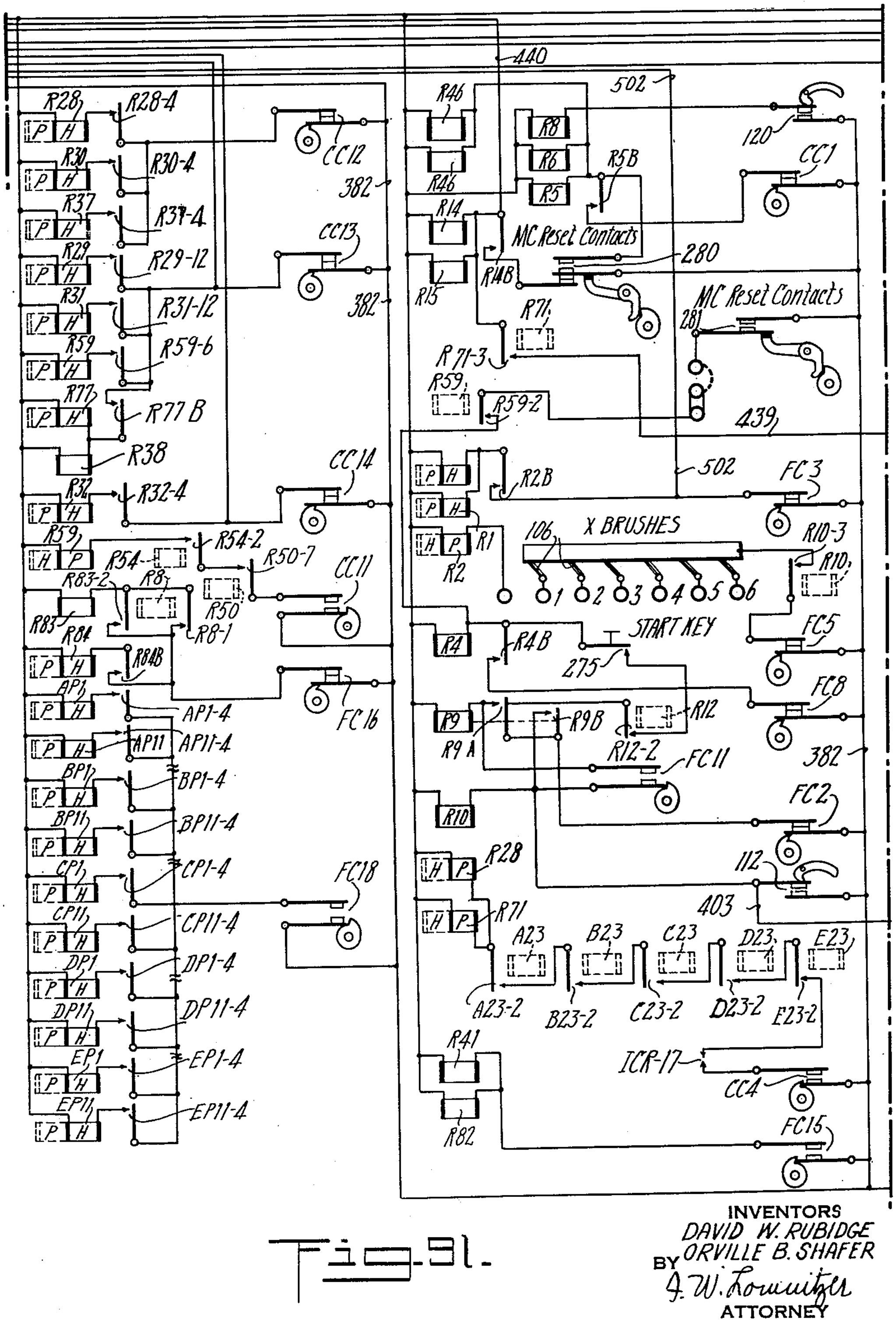

In Fig. 9*j* there is shown five groups of utilization relays designated A1–A11, B1–B11 and C1–C11, D1–D11 and E1–E11 which comprise, if all were shown, 55 relays set up under control of the corresponding first mentioned five groups of relays AP–EP(1–11). It will be recalled that the AP–EP(1–11) relays are held energized by FC18 cam contacts until the point 11 in the second machine cycle. These energized relays close their respective "1" contacts (Fig. 9*j*) so that when cam contacts FC14 close at the 3 point in the second machine cycle of the same card feed cycle a circuit will be closed from the line 382, through card lever contacts 112 (Fig. 9*l*), wire 403, cam contacts FC14 (Fig. 9*m*), wire 404 (Figs. 9*m*, 9*l*, 9*k*, 9*j*), thence through the respective "1" contacts of the energized AP–EP(1–11) relay, the pickup coil of an A–E(1–11) relay, to line 381. For example, if the AP2 relay was energized, due to a "0" perforation in column 43, the circuit would extend through AP2 contacts, A2 pickup relay coil to line 381. In the same manner the other utilization relays in the five different groups are picked up by the closure of the "1" contacts of the coordinated AP–EP(1–11) relay. The energized A2 relay, in the above example, closes the A2–4 contacts and a hold circuit for the pickup winding is extended through such relay contacts, wire 405 (Figs. 9*j*, 9*k*) and cam contacts CC14, to line 382. The energized A2 relay, for example, also closes the related A2–3 contacts to energize the holding winding of the A2 relay, the circuit being established from line 381, the holding winding of the A2 relay, the A2–3 relay contacts, A13—9 relay contacts now closed, wire 406 (Figs. 9*j*, 9*k*, 9*l*, 9*m*) and cam contacts CC9, to line 382. From the timing diagram of Fig. 8 it will be seen that during the time that cam contacts CC14 open during the cycle cam contacts CC9 close to overlap the former for reasons which will be evident later on. It is pointed out that one or more A–E(1–11) relays in each group may be energized and the number of subsequent cycles that the utilization relays are held energized depends upon the greatest number energized in any group. For example, if relay A2 was the only relay energized, due to the presence of one hole in the column, it would be held but for one cycle. If more than one hole was punched in the same column (as for column 43) the A2, A3 and A8 relays would be energized but the A8 relay would be held for three cycles, the A3 relay for two cycles, and the A2 relay for one cycle.

*Entry control relays*

There are five groups of entry relays shown in Fig. 9*k* designated A12–A22, B12–B22, C12–C22, D12–D22, E12–E22 and one or more relays of the five groups A1–A11–E1–E11 will tend to energize one or more corresponding relays of the first mentioned groups by the closure of the "1" contacts. However, the "1" transfer contacts of each group of the A12–A22, B12–B22, E12–E22 relays (and other transfer contacts to be later described) are so connected in series that for each group only one entry control relay is energized at a time, and one entry control relay in the same group for each subsequent machine cycle. The energizing circuit for the 12–22 relays of each group is from the line 382, cam contacts CC8 (Fig. 9*m*), wire 407 (Figs. 9*m*, 9*l*, 9*k*), R84A relay contacts (Fig. 9*k*) now closed in a manner now to be explained, R71—1 relay contacts now closed, wire 408, the "1" contacts of the respective 1–11 utilization relay, the related 12–22 entry relay to line 381.

The R84A relay contacts are closed by the following circuit: From line 381, R84 relay coil (Fig. 9*m*), cam contacts FC14, wire 403, card lever contacts 112 (Fig. 9*l*) to line 382, R84 coil picks up R84B contacts to complete an obvious circuit through FC16 cam contacts to the holding winding of the R84H relay coil (see Fig. 9*l*).

Each cycle CC8 cam contact sends a pulse by wire 408 to energize a 12–22 relay, but said entry control relays are picked up in the order 12, 13, 14, etc. to 22, due to the series arrangement of the "1" transfer contacts. If in one group of utilization relays 1–12 the A8, A3, A2 relays were energized (in the example of Fig. 4), the transfer of the A2—1 relay contacts would cause the A13 entry control relay to be picked up first, and it in turn opens the A13—9 contacts to release the A2 holding coil. The pickup coil of the A13 relay closes the A13—12 relay contacts to energize the holding coil of the A13 relay. All entry control relays when energized are held by a wire 409 (Figs. 9*k*, 9*l*) through cam contacts CC13 back to line 382, deenergizing the energized entry relay at the end of the entry cycle. The deenergized utilization relay enables the transfer of its "1" contacts which go back to normal, preparing the impulse circuit from CC8 cam contacts to be directed to the next entry relay, or A14 in the assumed example. The sequential operation continues to pick up the A19 entry control relay and will be understood by the following chart:

| Entry Cycle | Utilization Relay Picked Up and Released | Entry Control Relay Picked Up |
|---|---|---|
| 1 | A2 | A13 |
| 2 | A3 | A14 |
| 3 | A8 | A19 |

A test occurs at the "6" time when cam contacts CC14 open but this does not affect the holding circuit for the higher numbered utilization relays because cam contacts CC9 overlap contacts FC14. When cam contact FC14 opens it deenergizes the pickup winding of A2, and since A13 has opened A13—9 contacts the holding circuit for the holding winding of A2 opens when CC9 opens. However, since A3 utilization relay is energized the holding circuit for the holding coil thereof is by CC9 contacts and A14—9 relay contacts. In this manner a previously used utilization relay is dropped out but the next highest numbered one is retained energized.

When the last entry cycle is terminated, all of the "1" transfer contacts of the utilization relays are normal and the impulse from CC8 by wire 408 is directed through all "1" transfer contacts to the pickup coil of the A23 relay, which closes its "4" contacts to energize the holding coil of the A23 relay, which holds through the CC13 cam contacts.

When all entries are completed all relays A23, B23, C23, D23, E23 are energized and provide a circuit to initiate the "gathering cycles."

*Preset multiplicand amount entry cycles*

During the successive multiplicand entry cycles the preset multiplicand amounts which are selected by the energized multiplicand entry control relays A–E(12–22) are entered and by as many cycles as is required to enter all of the multiplicand amounts selected by the perforations in each column. In the present example, since column 43 is perforated at the 0, 1 and 6 index point positions, (see Fig. 4), three respective entry control relays A13, A14, and A19 are energized in the named order and these relays cause three successive entry cycles. During the first entry control cycle an entry of a preset multiplicand amount is effected under control of the energized A13 entry control relay.

Referring to Fig. 9*a* the energization of the A13 relay transfers its A13, 1–8 relay contacts. Each relay A(12–22) transfers a set of 1–8 relay contacts. The normally open blade of each of these contacts for each relay is connected to a row of plug hubs 410 and by means of selective plug connections 412 made between the plug hubs 410 associated with the A13 relay contacts 1–8 to a series of digit emitter hubs 411 (Fig. 9*d*) the desired multiplicand amount "14" will be entered. The plugboard in Fig. 9*d* has 55 rows of digit emitter hubs, and plug connections 412, 413, 414 are shown connected to effect the entry in the MC accumulator of "14," "18" and "12" in succession, according to the example in Fig. 5. This is effected by energizing the A13, A14, A19 relays in succession to transfer the related 1–8 contacts in Fig. 9*a*.

From Fig. 9*d* it will be observed that the plug hubs 411 of the same digit are connected by a strap and the nine straps for the digits 1–9 have related wire connections 415 to contacts of an emitter E*m*1. The brush of this emitter, whose timing is shown in Fig. 8, is connected by a wire 416 to the circuit breaker contacts CB1—4. It will be noted that upon the transfer of the A13 (Fig. 9*a*), 1–8 relay contacts, emitter E*m*1 transmits selected digit impulses through the normally closed contacts 1–8 of the higher numbered relays and also through the relay contacts 1–8 of R31 relay which are now in the position shown, to the 390MC accumulator magnets. The plug connections 412, 413, 414 from the emitter represent the preset multiplicand amounts and according to such plug connections the preset multiplicand amounts 12, 14, 18 are entered in the MC accumulator. The return circuit from the 390MC magnets is through the closed relay contacts A2 which are in the position shown, to ground.

Figures 3, 5:
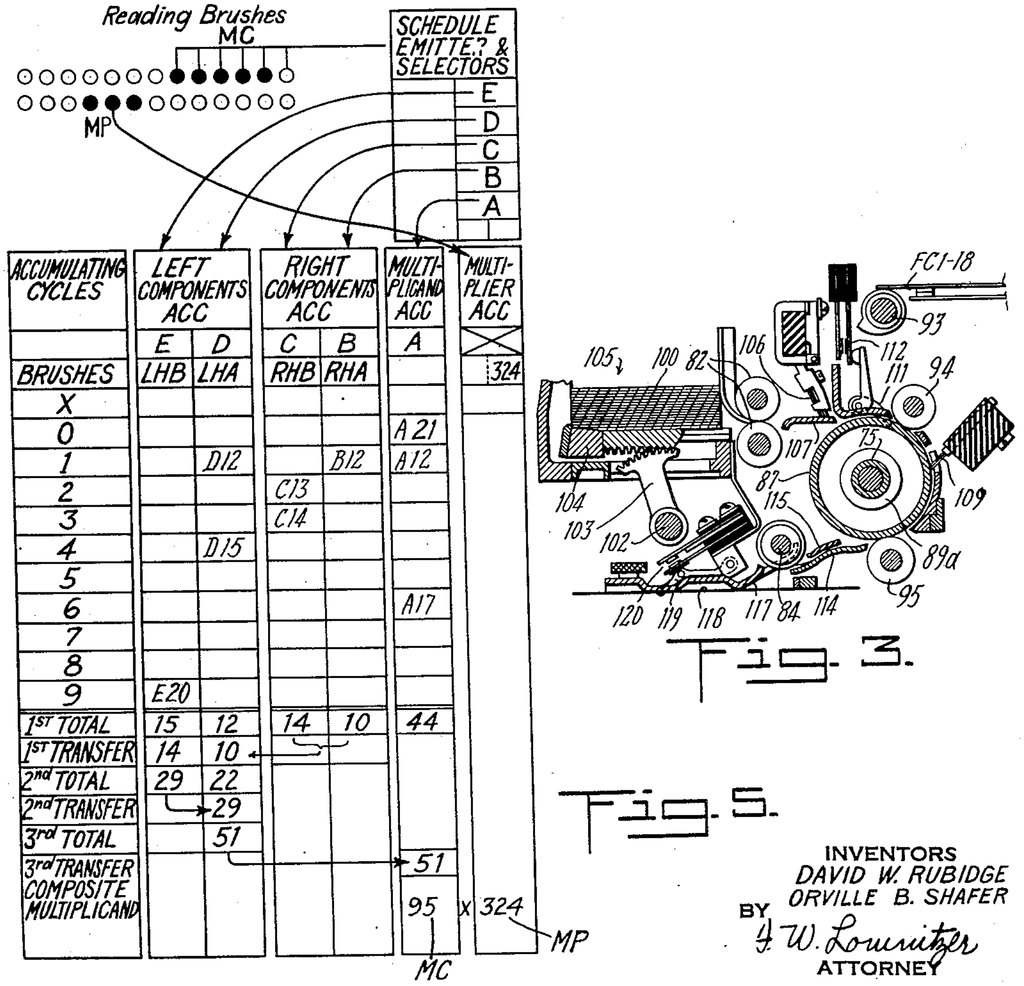
Fig. 3 is a vertical sectional view taken through the card handling and reading section of the machine.
Fig. 5 is an outline of the manner in which the multiplying computation controlled by the card is performed.

Also in the same entry cycle that "14" is entered by the A13 entry control relay in the MC accumulator, preset multiplicand amounts 10, 4, 12 and 15 are entered in the respective RHA, LHA, RHB, LHB accumulators, due to the energization of the entry control relay B12, D12, C13, E20, respectively (see Fig. 5).

The B12 entry control relay closes its 1–6 relay contacts (see Fig. 9*g*) and by suitable plug connections from the plug hubs 420 of such relay contacts to the digit emitter plug hubs 411 shown in Fig. 9*d* the multiplicand entry "10" is effected in the RHA accumulator. Energization of the D12 entry relay closes the 1–6 contacts (Fig. 9*f*) and effects in a similar way the entry in the LHA accumulator of a multiplicand amount 4 by plug connection to digit emitter hubs 411. Now, referring to Fig. 9*g*, energization of the relay C13 closes its 1–6 relay contacts and a preset multiplicand amount of 12 is concurrently entered in the RHA accumulator and then in the same manner entry control relay E20 (Fig. 9*f*) effects the entry of a preset multiplicand amount 15 in the LHB accumulator. Thus, during the first entry cycle a plurality of preset multiplicand amounts are concurrently entered in different accumulators.

During the second entry cycle entry control relays A17, C14 and D15 cause entries of preset multiplicand amounts 18, 2, 8 in the MC, RHB, LHA accumulators, respectively. During the third entry cycle the A21 entry control relay effects the entry of a third preset multiplicand amount 12 in the MC accumulator. At the termination of the entry cycles, which are limited in number to the maximum number of multiplicand selecting perforations in a single column there will have been accumulatively entered in the MC, RHA, RHB, LHA, and LHB accumulators the selected preset multiplicand amounts and at the termination of the last entry cycle the so-called "gathering" or total transferring cycles are initiated as will now be described.

TOTAL TRANSFER CYCLES

*1.—Transfer from RHA and RHB to LHA, LHB, respectively*

Upon the completion of the last entry cycle relays A23–E23 are all now energized and will close the A23—3 to E23—3 contacts (Fig. 9*a*, bottom right) to complete a circuit from the line 383 through CC2 cam contacts, interlock contacts 83—3 now closed, (Fig. 9*b*) serially through the E23—3 to A23—3 contacts (Fig. 9*a*), all now transferred, to the multicontact transfer control magnet 1CR, which is the same as in the Daly Patent No. 2,045,437.

The R83 relay coil is shown in Fig. 9*l*, and is energized by an obvious circuit through previously closed R8—1 relay contacts, and is held through the R83—2 stick contacts and FC18 cam contacts (see Fig. 6*a*). Energization in the magnet 1CR permits closure of the related contacts 1CR, 1–17 and contacts 1–16 (Fig. 9*e*) connect the RHRO readout in which the total amounts in the RHA and LHA accumulators are represented with the E*m*1 emitter. Accordingly, upon operation of emitter E*m*1 (265 in the Daly patent) impulses are directed through a group of lines 430 (Figs. 9*d*, 9*e*) and through the R44—1–9 transfer contacts now normal, through the contact points and segments of the RHRO readout, through the 1CR, 1–16 contacts, wires 431, (Figs. 9*e*, 9*f*) through the 1–6 relay contacts of E12–22, and D12–22 relays, now normal, to the 390 LHA and LHB accumulator magnets. Thus, the two totals 10 and 14 standing in RHA and RHB are added to the totals 12 and 15 in LHA and LHB accumulators and in corresponding orders. LHA and LHB now represent 22 and 29 (see Fig. 5). During the first transfer cycle circuits are conditioned to prepare the total transfer operations which occur during the second transfer cycle.

*2.—Transfer from LHB to LHA accumulator*

Closure of the 1CR—17 relay contacts (Fig. 9*l*, lower right) closes a circuit when the CC4 cam contacts close which extends from line 381, through the pickup winding of the R71 relay coil, thence serially through the A23—2 to the E23—2 relay contacts now closed, thence through 1CR—17 contacts and cam contacts CC4 to line 382. A circuit is also completed to the R28 relay which is in parallel with R71 relay. The hold circuit for R28H is through R28—4 and C12 cam contacts (see Fig. 9*l*, left top). The pickup winding of the R71 relay coil closes its R71—2 relay contacts (Fig. 9*m*) and completes a hold circuit from line 381, through R71H relay coil, R71—2 relay contacts, R80A relay contacts now closed to line 382. R80A relay contacts retain the R71 relay energized until card punching operations take place (See Fig. 6*b*). Upon closure of the R28—1 relay contacts (Fig. 9*m*, left top) a circuit is completed from line 381, through the pickup winding of the R29 relay, through the R28—1 relay contacts, CC8 cam contacts, to line 382. The energized R29 pickup coil relay closes the R29—12 hold contacts (see Fig. 9*l*, left top), closing a circuit from line 381 through the R29H relay, thence through the R29—12 contacts, and cam contacts CC13 to line 382. CC13 cam contacts hold the R29 relay energized during the entry operation of the second transfer cycle. From Fig. 9*f* it will be seen that the R29 relay closes the R29, 1–8 contacts to complete transfer circuits by means of which the amount in the LHB accumulator is transferred and added to the amount in the LHA accumulator.

During this second transfer cycle, impulses directed by the emitter E*m*1 are sent over the wires in a cable (Figs. 9*f*, 9*g*, 9*h*) and are directed through normally closed relay contacts R45, 1–9 to the LHB—RO readout section. According to the digit representing positions of the brushes of this readout, selected digit impulses are directed by wires 433 in a cable 435 (Figs. 9*h*, 9*g*, 9*f*) and through transfer contacts R29, 1–8 (now transferred) to the corresponding orders of the 390 LHA accumulator magnets. The LHA now represents the totals in RHA, RHB, LHB and LHA, and in the present example is 51 (see Fig. 5). In the next cycle there is a transfer of the total in LHA to the MC accumulator.

*RHA, RHB reset*

With the R29—10 contacts now closed, an impulse will be directed by a circuit from cam contacts CC2 (Fig. 9*a*) through R29—10 contacts (Fig. 9*b*) and the 392 RHA, 392 RHB reset magnets, to ground, thus resetting the RHA and RHB accumulator sections in the second transfer cycle.

*3.—Transfer from LHA to MC accumulators*

During the second transfer cycle, circuits are conditioned to cause the transfer of the total in the LHA accumulator to the MC accumulator (see Fig. 5). When cam contacts CC10 (see Fig. 9*m*, left center) close during this second transfer cycle the pickup winding of the R30 relay is energized by a circuit extending from line 381, R30 pickup relay coil, R29—9 relay contacts now closed, CC10 cam contacts to line 382. The pickup winding closes the R30—4 relay contacts, completing a circuit from the line 381, through the R30 holding winding, R30—4 relay contacts (Fig. 9*l*, left top) now closed and cam contacts CC12 which hold R30 relay energized to the end of the second transfer cycle. When cam contacts CC8 close during the second transfer cycle, a circuit is completed from line 381, pickup winding of the R31 relay (Fig. 9*m*, left top), R30—1 relay contacts now closed, cam contacts CC8 to line 382. R31—12 contacts close, completing a holding circuit for the R31 holding coil from line 381, through said coil, through contacts R31—12 and CC13 cam contacts to line 382. Referring to Fig. 9*a*, lower left, the R31 relay closes its 1–8 contacts so that during the third transfer cycle impulses directed by the emitter Em1 and passing over the wires in the cable 432 previously mentioned will be directed through relay contacts R45, 1–9 to the LHA readout section, and according to the brush positions in the eight denominational orders of the LHA—RO readout section, selected digit impulses will be transmitted by wires in a cable 435 (Fig. 9*h*, and Fig. 9*a*) and then will pass through the now transferred R31, 1–8 contacts to the 390MC magnets. These differentially timed impulses will thereby transfer the amount in the LHA accumulator to the MC accumulator which now represents 95 (see Fig. 5) which is the accumulated preset multiplicand amounts which have been selected by the perforations in card columns 43–47.

*SP reset*

During the third transfer cycle, or the cycle labeled "LHA to MC" (Fig. 6*b*), the SP accumulator is reset by energization of the 392SP reset magnet (Fig. 9*b*). The reset circuit is from CC2 cam contacts, R17—4 relay contacts, R12—3 relay contacts, R8—3 relay contacts, all now closed, R35—1 contacts now closed, 392SP reset magnet. After the reset has been initiated R35 energizes, as will be described, to open contacts R35—1 to prevent a repeat reset.

During the reset of SP accumulator, reset contacts 278 (Fig. 9*m*) are transferred to complete a line from 381, the pickup coil of R35, reset contacts 278 now transferred, to line 382. R35 closes R35—4 contacts to complete a circuit from line 381, through R35H, relay contacts R35—4, relay contacts R80A now closed to line 382. The R35H relay (as well as R71H) are held energized until the beginning of the second machine cycle of the next card feed cycle when R80 relay is energized by a circuit from line 381, relay coil R80, R59—3 relay contacts now normal, cam contacts FC17 to line 382.

*Reset cycle for LHA and LHB accumulators*

During the third transfer cycle a circuit will be completed when cam contacts CC10 close from the line 381, through the pickup coil of the R32 relay (Fig. 9*m*), thence through the R31—9 contacts now closed, cam contacts CC10 to line 381.

The reset circuit for the LHA and LHB accumulator sections is from CC2 cam contacts, R32—1 relay contacts now closed, R13A relay contacts now closed, to the LHA and LHB reset magnets to ground, thus resetting both accumulator sections prior to effecting multiplication. The holding circuit for the hold winding of such R32 relay is maintained by a circuit from the line 381, through the R32H relay coil, through R32—4 relay contacts and cam contacts CC14 which retain the R32 relay energized until the sixth point of the LH reset cycle following the third transfer cycle.

*Multiplying*

The machine is now ready to set up the cycle controller and follow up with actual multiplying operations, which are carried out like the machine of the Daly patent, No. 2,045,437.

Upon reset of the LHA, LHB accumulator sections LHB reset contacts 272 (Fig. 9*m*), LHA reset contacts 273 and the LHB reset contacts 274 are closed. A circuit will then be closed from line 382, through contacts 272, through contacts 273, through contacts 274, wire 439 (Figs. 9*m*, 9*l*), through R71—3 contacts now closed, to R14 and R15 relays, to line 381. A stick circuit for the R14 and R15 relays is provided through R14B relay contacts, the multiplicand reset contacts 280 now in the position shown, back to line 382. R14 and R15 are the master relay magnets of the cycle controller unit (corresponding to M and N relays of the Daly patent, No. 2,045,437) and they call the cycle controller into operation to determine the location of significant figures in the multiplier. Upon closure of R14B relay contacts the line side 382 is extended by a wire 440 (Figs. 9*l*—9*b*) through R14—2 relay contacts (Fig. 9*b*) to the zero segments of the MPRO readout. If any of the brushes of the MPRO stand at zero, selected ones of the column skip magnets Y*u*, Y*t*, etc. will be energized according to which demoninational orders of the multiplier contain zeros. The magnets Y*u*, Y*t*, etc. control contacts Y*u*2, Y*t*2, etc. through which circuits are completed to the column shift relay magnets CS*u*, CS*t*, etc., and to the multiplying relay magnets X1–X9.

In those positions in which the multiplier digit is zero, the associated magnet Y*u*, Y*t*, etc. will be energized and the related contacts Y*u*2, Y*t*2, etc. will be shifted from the position shown in the diagram so that the related magnet CS*u*, CS*t*, etc. will be disconnected from the circuit which is traceable from line 383, cam contacts CC2 (Fig. 9*a*), wire 441 (Fig. 9*b*), relay contacts R14A now closed, normally closed contacts Y*u*2, relay magnet CS*u*, through the appropriate readout spot in one order of the readout section MPRO, by a wire 394 to the corresponding X1–X9 multiplying relay magnet (Fig. 9*c*), and thence to ground. The function of the contacts Y*u*2, Y*t*2, etc. is to direct the multiplying relay selecting circuits through only those positions in which significant figures occur in the multiplier and to skip the positions in which zeros occur.

With a particular multiplying relay magnet energized, for example, the X5 magnet, the related contacts shown in the center of Fig. 9*d* will become closed and with the emitter Em1 in constant operation impulses will be emitted through the contacts of the 5 times multiplier relay magnet X5 and thence by wires 397RH through the readout device of the MCRO multiplicand accumulator (Fig. 9*e*), wires 398RH (Figs. 9*e*, *f*, *g*), through the right column shift relay contacts CSR, plug connections 450, through the CA1, 1–12 contacts now normal (not employed in the present invention) through related contacts of the B12–22 relays and C12–22 relays to the 390RHA and RHB accumulator magnets to ground. Also by wires 451 connections are also made to certain of the 390RHB magnets for the same entry purposes. By these circuit connections the right hand partial products are entered in RHB and RHA, in the usual manner.

Also from readout MCRO (Fig. 9*e*) impulses are directed through 398LH, through the column shift left contacts CSL. From plug sockets connected to the respective CSL contacts which are wired to provide the proper denominational shift there are plug connections 452 to a series of plug sockets 453. From such plug sockets impulses are directed through the now normal transfer contacts of the CA2 relay (not employed in the present invention), and thence by wires 431 (Figs. 9*e*, 9*f*) through the E12–22 contacts to the 390LHB accumulator magnets, through the D12–22 contacts, through the R29, 1–8 relay contacts now normal, to the 390LHA accumulator magnets. By these circuit connections the left hand partial products are entered in LHB and LHA in the usual manner. The CSL and CSR relay contacts are controlled by the relay magnets CS$u$, CS$t$, etc. and serve to effect the proper denominational allocation of the partial product entries. Thus, when multiplying is being effected by the units digit of the multiplier, the units magnet CS$u$ is energized and the units order sets of contacts CSL and CSR are closed.

Energization of a relay magnet CS$u$, CS$t$, etc. (Fig. 9$b$) will also close a pair of contacts CS$u$3, CS$t_3$, etc. which will cause energization of the relay magnet Y$u$, Y$t$, etc. in the order in which multiplying is taking place. This, in turn, will shift the related pair of contacts Y$u$2, Y$t$2, etc. so that when cam contacts CC2 again close the aforetraced circuit will be directed through the magnet CS$u$, CS$t$, etc. in the order containing the next higher significant figure and will skip the magnets CS$u$, CS$t$, etc. in positions in which zeros are present.

*Partial products combining cycle*

After the multiplying computation is completed the amount in the RHA, RHB accumulator is transferred to the LHA, LHB accumulator, and during this cycle, which follows the last multiplying cycle, the MC and MP accumulators are reset (see Fig. 6$b$).

Upon completion of the multiplying computation all the Y2 contacts will be in the reverse position shown so that upon closure of cam contacts CC2 a circuit will be completed from CC2 contacts, wire 441, R14A relay contacts now closed, serially through the Y2 set of contacts, wire 454 (Figs. 9$b$, 9$a$), the R35—2 relay contacts now closed, to the 392MC reset magnet, which causes the reset of the MC accumulator.

A branch circuit also extends from R35—2 contacts through cam contacts FC10, relay contacts R59—1 now closed, to the 392MP reset magnet, through the switch 396 (in closed position for normal multiplication) to ground. Energization of 392MC and 392MP initiates resetting of the MP and MC accumulators after multiplication has been completed, which ensues during the partial products combining cycle.

A branch circuit also extends to the 1CR relay magnet from relay contacts R35—2, the A23—3 contacts now normal, and the RH to LH transfer magnet 1CR.

The 1CR relay transfers its contacts (Fig. 9$e$) to connect the RHRO readout of the RH accumulator to the 390 entry control magnets of the LHA and LHB accumulator sections. Impulses directed by emitter E$m$1 pass through wires 430, through the R44, 1–9 relay contacts now normal, through the RHRO readout, 1CR contacts, 1–16 contacts now transferred, CA2 contacts now normal, wires 431, through the E12–22 and D12–22 transfer contacts now normal, to the 390, LHA, LHB entry control magnets, to ground. Thus, the LHA, LHB accumulator now represents 30780 which is the product of the added preset multiplicands and the multiplier amount, which product amount is then transferred to the SP accumulator.

*LH to SP transfer*

During the reset of the MC accumulator the MC reset contacts 280 (Fig. 9$l$, right top) transfer to drop out R14 and R15 relays and by an obvious circuit relays R5, R6 and R46 are energized, which hold through the R5B contacts and cam contacts CC1 to line 382. R46 is the relay which effects the transfer of the amount from the LHA accumulator to the SP accumulator. Relay R46 closes its R46, 1–16 contacts (see Fig. 9$h$). Thus, impulses directed by emitter E$m$1 passing through wires 432 will pass through the normally closed contacts R45, 1–9 through the RO readout LHB, LHA, through the R46, 1–16 contacts, plug connections 455 (Fig. 9$h$) to the 390SP entry control magnets of the SP accumulator, to ground.

Closure of the MC reset contacts 281 (Fig. 9$l$, right) closes a circuit from the line 382, through contacts 281, R59—2 contacts now closed, the R4 relay coil to line 381. Relay R4 closes the R4A relay contacts (see Fig. 9$m$, top right) to energize the card feed clutch magnet 384 to feed the next card, as previously explained, to have its MC and MP data analyzed to control the next computation.

FC17 contacts close in the second machine cycle of this car feed cycle and to repeat a previous description at this point cause R80 relay to be energized by an obvious circuit. This relay opens its R80A contacts (Fig. 9$m$, left center) to drop out R71 and R35 relays.

The impulse from FC17 is directed by a wire 457 (Fig. 9$m$, center) to the pickup coil of the R3 relay. R3 relay closes the R3—4 relay contacts, closing a circuit from line 381, the pickup winding of R16 relay, R3—4 relay contacts, R6A contacts now normal, to CC3 contacts to line 382. The R16B and R3—2 relay contacts pick up the respective hold coils of R16 and R3 relays which are held back to line 382 through the 278SP reset contacts.

*Card punching*

Punching is effected in the same manner as in the Daly patent, No. 2,045,437.

The punch circuit extends from line 382, through the R17—1 contacts (Fig. 9$m$, right center), R16A contacts now closed, R3A relay contacts now closed, the floating cam contacts 215 in the punch unit, punch switch S1 in dotted line position, R7B relay contacts (not employed in the present invention) now normal, wire 438 (Figs. 9$m$, $l$, $k$, $j$, $h$) to the common conducting strip 222 of the punch column readout.

The strip 222 (Fig. 9$h$) is connected in succession to the segments 221 as the brush 223 on the carriage which carries the record card moves step by step past the column of punches in the punching unit and those plug sockets 465 that are plug connected to plug sockets 466 of the SPRO readout will complete circuits to the punch selecting magnets 467 whose common return wire is connected to the line 381.

As explained in the above mentioned Daly patent, the energization of any of the magnets 467 will advance a related interposer into operative relationship with a corresponding punch and the advancement of any interposer will cause closure of a pair of contacts 470 which complete a circuit from line 381, through the punch magnet 471, contacts 470, R3A, R16A contacts now closed, R17—1 contacts, to line 382. The punch magnet serves to press the selector interposer against the punch to effect a perforation in the corresponding position in the card column.

While the step-by-step punching of the product takes place, there is a new setup of the utilization relays and the new MP amount is entered in the MP accumulator. When the card is completely punched and advanced to its last column position the P5 last column contacts close to complete a circuit to the eject magnet and R12 relay (Fig. 9$m$, right center).

*Multi-period computations*

The machine is conditioned for performing operations according to this type of computation by making the plug connection 500 (Fig. 9*m*, lower left) which will maintain the R65 relay continuously energized. Also another plug connection 501 (Fig. 9*i*) is made to continuously energize the R55 relay.

In the multi-period computation operation of the machine many of the operations involved are the same as those previously described and by the same circuits so that an entire repetition will not be necessary. However, where the functions or operations change, due to different circuits, these will be described in detail. The timing for the most of the added relays involved is shown in Fig. 7*a, b, c*.

It will be assumed that a card shown in Fig. 4 passes through but does not bear any perforations at the 5 to 9 index point positions in MC columns 43 to 47. There are perforations, however, at index points 0–4 of columns 43—47. Thus, twenty-five numbers of models can be assigned to these twenty-five perforated index point positions. For example, the "3" index point in column 45 may represent Model No. 10, for which twenty-five cars will be made in the first period; "25" representing the preset multiplicand selected by plug connections to the digit emitter. As will be evident later on, this same "3" index point may select another preset multiplicand amount, representing by other plug connections to the digit emitter 28 cars of Model No. 10 to be made in the second period. The first computation is under control of a setup made under control of the "3" card perforation and the second computation is performed by a setup also made under control of the "3" perforation but retained during the first period computation.

The perforated card in Fig. 4 is fed during the second card feed cycle (upon starting up), and in the second machine cycle of this card feed cycle the LHA and LHB accumulators are reset, as previously described. As the card is fed past the analyzing devices the following AP—EP relays are energized under control of the perforations in columns 43—47 (see Fig. 9*c*).

| Column | Perforation Index Point | First Period Relays Energized |
|---|---|---|
| 43 | 0, 1 | AP2, AP3 |
| 44 | 1 | BP3 |
| 45 | 2, 3 | CP4, CP5 |
| 46 | 1, 4 | DP3, DP6 |
| 47 | None | None |

Since relay R55 is energized and all of its 1–5 relay contacts are closed (see Fig. 9*c*), there will be a pickup of other AP relays by the perforations due to the closure of such relay contacts. These are the AP–EP relays pertaining to the second period.

| Column | Relays for Second Period Energized |
|---|---|
| 43 | AP7, AP8 |
| 44 | BP8 |
| 45 | CP9, CP10 |
| 46 | DP8, DP11 |
| 47 | None |

The AP(2–6) relays of the first period will, for example, through the related utilization relays, pick up the corresponding entry control relays A13–17 which, in the manner previously described, select preset multiplicands, while the AP7–11 relays of the second period will, through the A18–22 entry control relays, select the same or other multiplicands. The AP–EP relays of either period may not select any preset multiplicand amounts, depending upon the number of cars to be made in each period.

At the beginning of the second machine cycle of the card feed cycle cam contacts FC15 (see Fig. 9*l*, lower right) close to pick up R41 and R82 relays by an obvious circuit, and said cam FC15 holds such relays energized until nearly the end of the second machine cycle (see Figs. 7*a* and 8). When FC14 cam contacts close at the "3" point in the second machine cycle, a circuit is closed from line 382, through card lever contacts 112 now closed (Fig. 9*l*, left bottom), wire 403, cam contacts FC14 (Fig. 9*m*, upper left), wire 404 (Figs. 9*m*, 9*l*, 9*k*, 9*j*, 9*h*, 9*i*), R55—26 relay contacts (Fig. 9*i*), R41—12 relay contacts, pickup winding of R50P relay coil, to line 381. Closure of R50—12 contacts energizes R50H, which holds back by one holding circuit through said relay contacts R51—12, R80B contacts now closed, and by a wire 502 (Figs. 9*i*, *j*, *k*, *l*), back to line 382 through FC3 cam contacts. When FC3 opens at the "0" point, a test takes place to see if R50H can be held by a supplemental hold circuit controlled by utilization relays in the groups A2–A6, B2–B6, C2–C6, D2–D6, E2–E6. These relays close supplemental "2" contacts (Fig. 9*i*) and as long as one of these is closed the supplemental hold circuit for relay R50 is maintained through such "2" contacts, R82A relay contacts, to line 382. FC3 cam contacts close before R82 relay is released so that R50 relay is held energized as long as any of the preceding groups of relays is energized.

From Fig. 9*k* it will be seen that the R50—1, R50—2, R50—3, R50—4, R50—5 relay contacts break the impulse circuit 408 leading to A23, for example, so that A12–A17 entry control relays are picked up in succession to effect a first period computation and then to A23, and then A18–A22 entry control relays are energized in succession to effect a second period computation and then the A23 relay. Since A12–E12 are not utilized the successive energization of subgroups may be regarded as A–E 13–17 and A–E 18–22.

Digressing, at this point, the first period relays AP2, AP3, BP3, etc. which have been picked up (see table) select the related utilization relays, so that in each first subgroup related entry control relays are picked up in succession. The pickup circuit for entry control relays is the same as that previously described so that at the beginning of the first machine cycle after a card feed cycle the successive entry cycles begin (see Fig. 7*a*). It will be recalled that the maximum number of entry cycles depends upon the greatest number of entry control relays successively energized in each first subgroup, or the number of utilization relays energized. In multi-period operations the utilization relays for both periods remain energized, but the entry control relays in each first subgroup are picked up in succession by the impulse circuit closed by CC8, as previously described. Upon the last entry cycle which is governed by the last entry control relay of a first subgroup, the impulse from CC8 is directed through the R50, 1–5 relay contacts to (A–E)

23 relays, as before, and with all of the (A–E) 13–17 relays energized the circuit to initiate gathering of preset multiplicands is now started. The entry control relays of the first period have, of course, caused the entry of preset multiplicands in different accumulators, as before, and these are all summed up in the MC accumulator. However, the utilization relays for the second period remain energized (although they are ineffective) during such gathering cycles and the following multiplying cycles.

When R50 relay is picked up the same energizing impulse by wire 404 is directed to R54 pickup winding by a circuit from R55—27 relay contacts, R41—16 relay contacts, pickup winding of the R54 relay to line 381. One hold circuit is through R54—4 relay contacts, R80B relay contacts, and back to line 382 through FC3 cam contacts. The supplemental hold circuit back to line 382 is through R54—3 and the "2" contacts of the second period utilization relays A–E (7–11) and R82A. The test circuit to keep R54 energized is the same as that described for the R50 relay.

With relay contacts R54—2 and R50—7 closed in the second machine cycle of the card feed cycle an obvious circuit is closed to R59P when cam contacts CC11 close in the midportion of said second machine cycle (see Fig. 9*l*, left center). R59 relay is held energized after R50 deenergizes for a slightly longer time in the cycle (see Fig. 7*b*) by a circuit from line 381, R59H coil, R59—6 relay contacts and CC13 cam contacts to line 382 (see Fig. 7*b*).

Multiplying computations are carried out in the manner previously described and after the multiplying computation for the first period has been carried out, there occurs a partial product combining cycle RH to LH and then a transfer cycle LH to SP occurs (see Fig. 7*b*). However, a card feed which would normally take place at the beginning of the LH to SP transfer cycle is suppressed by the R59 control relay when computing according to a multi-period type of computation. In this transfer cycle there occurs a normal MC reset.

It will be recalled that the card feed clutch magnet 384 is normally energized when R4A relay contacts close (see Fig. 9*m*, right top) and energization of the R4 relay normally occurs when multiplicand reset contacts 281 close (see Fig. 9*l*, upper right). However, the energizing circuit for R4 is through R59—2 relay contacts and with such contacts open R4 is not energized, and card feed is suppressed at this time.

R59 relay also suppresses the resetting of the MP accumulator, since the amount in the MP accumulator is to be utilized in the second period computation, and the MP accumulator is not to be reset until multiplication for the second period is completed. The opening of the contacts R59—1 (Fig. 9*a*, lower center) prevents resetting of the MP accumulator, and the multiplier amount remains therein for the second computation.

As in computations for a single period the MC accumulator is reset in the same manner and by the same circuits, and during the cycle following completion of multiplication. Also by circuits previously described the closure of the MC reset contacts 280 (Fig. 9*l*, right top) cause relays 5, 6, and 46 to be energized, and the latter causes the transfer of the amount in the LH accumulator to the SP accumulator in the first machine cycle of the second period computation (see Fig. 7*b*).

Relay contacts R6A (Fig. 9*m*, lower left) are transferred in this cycle to complete a circuit from line 382, through cam contacts CC3, R6A contacts now transferred, wire 505 to R37 pickup coil to line 381. R37 relay closes the R37—4 contacts (Fig. 9*l*, upper left) which complete an obvious holding circuit through such contacts and cam contacts CC12 to the R37H relay coil.

The R37 coil closes the R37—1 contacts (Fig. 9*m*, upper left) to complete an obvious circuit through cam contacts CC8 to the R77P relays. R77B contacts (Fig. 9*l*, upper left) close to pick up R77H and R38 which hold through CC13 cam contacts to keep R77H and R38 energized during the second cycle of the second period computation.

There is a reset of the LHA and LHB sections in the second cycle of the second period computation, the reset circuit being from CC2 cam contacts (Fig. 9*a*), through R83—4 contacts (Fig. 9*b*) now transferred, R59—4 relay contacts now closed, R38—3 relay contacts now closed, R13A relay contacts now closed, 392 LHA, LHB reset magnets to ground.

Referring to Fig. 9*i* it will be seen that R77 closes the R77A relay contacts which closes the supplemental hold circuit for the R54 relay to thus retain the latter energized during the second period computation although R80B open as will now be described.

Since R59 relay is still energized in the second cycle of the second period computation to hold contacts R59—3 transferred (Fig. 9*m*, upper left), and contacts R38—1 are closed, when CC3 contacts are closed the R80 relay is energized. The circuit is from line 382, CC3 cam contacts, wire 506, R38—1, R59—3 relay contacts, R80, to line 381. Thus, at the beginning of the second machine cycle of the second period computation R80B relay contacts (Fig. 9*i*) now open, and since no utilization relay in any first subgroup in each row is energized, and all "2" contacts of such relays are open, the R50 relay is deenergized, and all of its contacts go back to normal, including R50—7 contacts in the R59P circuit (see Fig. 9*l*, left center). Consequently, when cam contacts CC13 open the R59H coil deenergizes, and this condition initiates the start of the second computation.

Meanwhile the machine has been conditioned to commence punching of the result of the first period computation, which is now in the SP accumulator. Digressing to the second machine cycle of the first period computation (see Fig. 7*a*), at the "4" point in this cycle, a circuit is closed from line 381, through R72P relay, (Fig. 9*m*, left center), R73—1 contacts now closed, CC10 cam contacts, to line 382. R72P closes the R72B contacts, completing a circuit from line 381, through R72H, R72B contacts, R80A contacts now closed, to line 382. Thus, R72 remains energized until R80 is energized, as has just been described.

Before starting punching for the multi-period computation, two plug connections 437 and 507 (Fig. 9*h*) are made from plug sockets 436 to plug sockets 465 of the column readout. The plug connection 437 is made to the column readout pertaining to the first column of one field to be punched to represent the result of the first computation, and plug connection 507 to the column readout pertaining to the first column of a second field to be punched to represent the result of the second computation. Also plug socket 509 is connected by a plug connection 510 to the plug socket pertaining to the highest order of the SPRO readout. There are, of course, a group of plug connections from all orders of the SPRO readout to plug sockets of the column readout pertaining to the first field to be punched and another group of plug connections to the column readout plug sockets relating to the second field to be punched. Thus, at the first column card position to be punched of the column readout the punch selecting circuit is open by contacts R72, which is maintained open until punching is to commence, when R80 energizes.

When the punch rack arrives at the first column of the first period field to be punched (assumed to be the first transfer cycle of the first period computation), a circuit is completed from line 382, through the R17—1 contacts now closed (Fig. 9*m*, right center), R65—2 contacts now closed, floating cam contacts 215, punch switch S1 in dotted line (punch) position, R7B contacts now normal, wire 438 (Figs. 9*m*, *l*, *k*, *j*, *i*) to the common strip 222 (Fig. 9*i*) of the column readout, column readout brush at said first column position, plug connection 437, R76A relay contacts now closed, and R73 relay to line 381. The R76A contacts are closed when R76 relay (Fig. 9*m*, left top) is energized by CC8 cam contacts by an obvious circuit. Relay R73 holds through R73—2 relay contacts (Fig. 9*i*) as long as the punch rack remains in said first column position. R73 closes the R73—3 contacts (Fig. 9*m*, left center) to provide a hold circuit for R35H through R69—1 and R73—3 relay contacts. R73 opens the contacts R73—1 (Fig. 9*m*, left center) in the pickup circuit of R72P. R73 closes the R73—4 contacts (Fig. 9*b*) to complete a circuit through R73—4 and R35—1 contacts now closed to the 392SP reset magnet when cam contacts CC2 close. This reset occurs in the LHB to LHA transfer cycle (see Figs. 7*a* and 7*c*) in both first and second period computations in the same way.

Figure 9M:
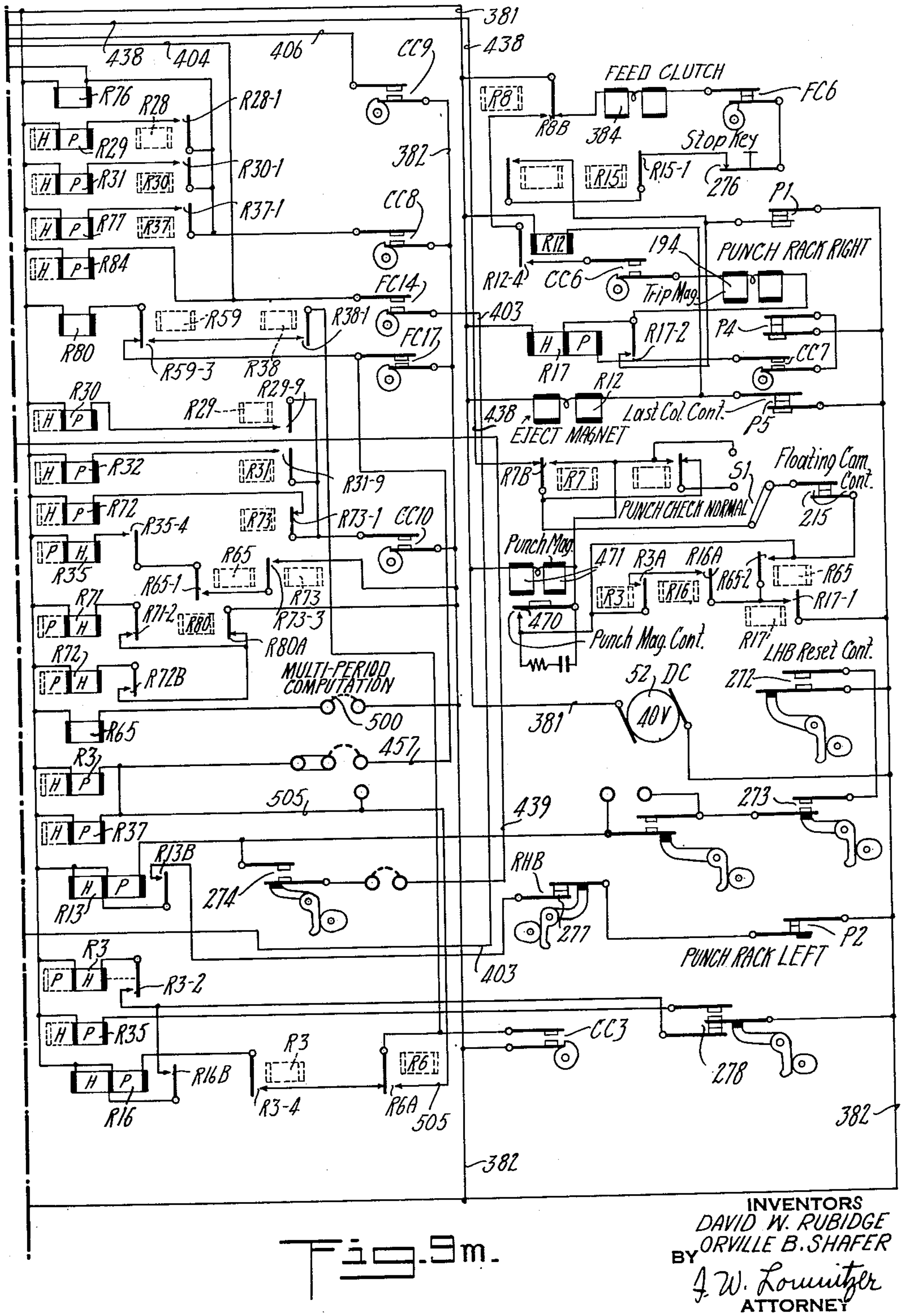

When R80 relay is energized, as previously described, the R72 relay is released and R72A contacts close (Fig. 9*h*) and thus card punching is initiated under control of the SPRO readout to punch the first period field. As soon as the punch rack leaves the first column punching position of the first period field R73 is released and the pickup circuit for R72 is restored by closing of contacts R73—1 (Fig. 9*m*, left center). R73—3 contacts (Fig. 9*m*, left center) open the hold circuit for R35H and the latter deenergizes. R72 is again energized in the manner previously described.

While punching of the first period field is taking place the energized utilization relays of the second subgroup are utilized to pick up the related entry control relays, one by one. The second subgroup of entry control relays cause preset multiplicant amounts to be entered in the respective accumulators, and these are gathered and finally entered in the MC accumulator. Multiplying of the second period computation takes place, with the amount in MP retained, and the final product is entered in SP accumulator. Since there is no further use for the amount in MC, it is reset by energization of the 392MC reset magnet, this taking place as a normal function in the first cycle after multiplication is completed since R59—1 contacts (Fig. 9*a*) are closed.

The result of the second computation on the SPRO readout then controls punching of the second period card field in the manner described for the first period card field punching. This card is ejected in the normal manner, and a second card is fed by the normal energizing circuit to the card feed clutch magnet since in this instance contacts R59—2 (Fig. 9*l*, upper left) are now closed; and permit the R4 relay to be picked up on multiplicand reset. The second card now controls first and second period computations, perhaps with a different MP which may represent a different number of parts for each model of the number of cars to be manufactured in each of the first and second periods.

While there have been shown and described and pointed out the fundamental novel features of the invention, it will be understood that various omissions and substitutions and changes in the form and details of the device illustrated and in its operation may be made by those skilled in the art without departing from the spirit of the invention. It is the intention, therefore, to be limited only as indicated by the scope of the following claims:

What is claimed is:

1. In a record controlled multiplying machine, a plurality of amount representing means from which a plurality of preset multi-denominational multiplicand amounts are potentially available and are set up prior to an operation of the machine, record controlled multiplier receiving means, a plurality of multiplicand receiving means including a final multiplicand receiving means, record controlled means for selecting the particular amount representing means which are to control entries in the respective multiplicand receiving means, means controlled by said amount representing means for effecting entry of selected multiplicand amounts in the related multipicand amount receiving means, means for additively transferring in a plurality of transfer cycles amounts from each of said multiplicand amount receiving means to said final multiplicand amount receiving means, and multiplying means automatically operable at the completion of the transfer cycles controlled by the multiplier receiving means and the final multiplicand receiving means for multiplying the final multiplicand amount by the entered multiplier.

2. In a record controlled multiplying machine, a plurality of groups of amount representing means in each group of which a plurality of preset multidenominational multiplicand amounts are potentially available and are set up prior to an operation of the machine, record controlled multiplier receiving means, a plurality of multiplicand receiving means including a final multiplicand receiving means, means for analyzing a plurality of perforated record columns, one record column for each multiplicand receiving means and each group of amount representing means, wherein a perforation in each record column designates the amount representing means of the associated group which are to be selected for control of entries, means controlled by said analyzing means for selecting, in accordance with the perforations analyzed in each record column, the particular amount representing means in each of the associated groups which are to control entries in the respective multiplicand receiving means, means for causing the selected amount representing means to be operable in serial order to effect by successive entering operations under control of the selected amount representing means in each group entry of selected multiplicand amounts represented thereby in the related multiplicand amount receiving means, said means operable to effect concurrent entries in the same entering operation in a plurality of multiplicand amount receiving means under control of a plurality of amount representing means of different groups but having the same position with respect to serial order, means for additively transferring in a plurality of transfer cycles amounts from each of said multiplicand amount receiving means to said final multiplicand amount receiving means, and multiplying means automatically operable at the completion of the transfer cycles controlled by the multiplier receiving means and the final multiplicand receiving means for multiplying the final multiplicand amount by the entered multiplier.

3. In a record controlled multiplying accounting machine, means for analyzing a record representing a multiplier amount involved in a dual multiplying computation effected under control of two separate multiplicand factors selected from the same record, means for receiving and representing the product of each multiplication, a plurality of means set up in the machine for representing a plurality of multiplicand amounts, two of which are selected under control of the same record and each of which enters in the related multiplying computation, supplemental record analyzing means having designated therein the multiplicand amount representing means to be selected, means for selecting according to the designations on the record the associated multiplicand amount representing means, multiplicand receiving and representing means, means to effect the entry of the selected multiplicand amount to be utilized for the first multiplying computation under control of the related multiplicand amount representing means in said multiplicand receiving and representing means, multiplying means controlled by said multiplier receiving means and the multiplicand receiving means for multiplying said multiplier factor and the multiplicand factor first entered in the multiplicand receiving means and forming the computed product in said product representing means, means for thereafter clearing out the product amount in said product representing means and the multiplicand amount entered in said multiplicand amount receiving means, means under control of the other selected multiplicand amount representing means for entering the other multiplicand amount in said cleared out multiplicand receiving means to be utilized with said multiplier factor receiving means for control of said multiplying means to effect the second multiplying computation and form the product result in said cleared out product representing means, clearing devices for said multiplier receiving means, and means to effect the operation of said clearing devices to clear out the multiplier factor receiving means at the completion of the second multiplying computation.

4. In a record controlled multiplying computing machine in claim 3 having recording means, means under control of said product representing means to effect recording of the product amount, and initiating means to effect and overlap the operation of the recording means under control of the product representing means during the time that the multiplying means is effecting another multiplying computation.

5. In a record controlled multiplying machine, a plurality of groups of amount representing means which are set up prior to an operation of the machine, a plurality of multiplicand receiving means, one for each group of factor amount representing means, a final factor receiving means, record controlled means for selecting the particular amount representing means in each of the associated groups which are to control entries in the respective amount receiving means, means for reading out a plurality of amount representing means selected in each group in serial order in each group to effect entry of selected amounts represented thereby in the related amount receiving means in a series of entry operations, and means for thereafter additively transferring in a plurality of transfer operations amounts from each of said amount receiving means to said final factor amount receiving means.

6. In a record controlled multiplying machine, a plurality of groups of amount representing means in each group of which a plurality of preset multidenominational multiplicand amounts are potentially available and are set up prior to an operation of the machine, record controlled multiplier receiving means, a plurality of multiplicand receiving means including a final multiplicand receiving means, means for analyzing a plurality of perforated record columns, one record column for each multiplicand receiving means and each group of amount representing means, wherein a perforation in each record column designates the amount representing means of the associated group which are to be selected for control of entries, means controlled by said analyzing means for selecting, in accordance with the perforations analyzed in each record column, the particular amount representing means in each of the associated groups which are to control entries in the respective multiplicand receiving means, and means for causing the selected amount representing means to be operable in serial order to effect by successive entering operations under control of the selected amount representing means in each group entry of selected multiplicand amounts represented thereby in the related multiplicand amount receiving means, said means operable to effect concurrent entries in the same entering operation in a plurality of multiplicand amount receiving means under control of a plurality of amount representing means of different groups but having the same position with respect to serial order.

7. In a record controlled multiplying machine, a plurality of amount representing means from which a plurality of preset multidenominational amounts are potentially available and are set up prior to an operation of the machine, record controlled multiplier receiving means, a multiplicand receiving means, means controlled by said analyzing means for selecting the particular amount representing means which are to control entries in the multiplicand receiving means and which correspond in number to the number of perforations analyzed, means controlled by selected amount representing means for effecting entry of selected multiplicand amounts represented by said selected amount representing means in the multiplicand amount receiving means, means for causing the readout of selected amount representing means in serial order to effect the entry of selected multiplicand amounts in said multiplicand receiving means in a series of entry operations, entry operation limiting means controlling said preceding means, and means operable in accordance with the maximum number of amount representing means selected to cause the operation of the entry operation limiting means to limit the number entry operations to the corresponding number of selected amount representing means.

8. In a record controlled multiplying machine, a plurality of groups of amount representing means in each group of which a plurality of preset multidenominational amounts are potentially available and are set up prior to an operation of the machine, record controlled multiplier receiving means, a plurality of multiplicand receiving means including a final multiplicand receiving means, means for analyzing a plurality of perforated record columns, means controlled by said analyzing means for selecting, in each of the groups of amount representing means, one or more of the particular amount representing means in each group according to the number of perforations in each record column which are to control entries in the respective multiplicand receiving means, means controlled by selected amount representing means in each group for effecting entry of selected multiplicand amounts represented by said selected amount representing means in the related multiplicand amount receiving means, means for causing the entry of selected multiplicand amounts in each multiplicand receiving means under control of selected amount representing means in each group in a series of entry operations, and for causing concurrent entry in a plurality of multiplicand receiving means under control of amount representing means in each group which are selected by corresponding perforations in associated record columns, entry operation limiting means controlling said preceding means, and means operable in accordance with the maximum number of amount representing means selected in any group to cause the operation of the limiting means to limit the number entry operations to the least number required to effect entries under control of all selected amount representing means.

9. In a record controlled multiplying machine for multiplying one factor represented on a record, and another factor comprising a plurality of selected amounts which are additively combined in a plurality of entering operations prior to multiplication, factor receiving means, record controlled means for entering said one factor in said factor receiving means, amount receiving means and correlated entering means, a plurality of means set up in the machine for representing amounts to be successively entered in said amount receiving means, means for analyzing perforations in a record designating amounts to be selected, means controlled by said last named analyzing means for selecting the setup amount representing means which are to be operable to control entering operations, means to cause said entering means under control of each selected setup amount representing means to enter selected amounts in the said amount receiving means, and means for rendering the selected amount representing means operable in serial order to effect by successive entering operations the entry of selected amounts in said amount receiving means whereby the latter represents prior to multiplication said other factor.

10. In a record controlled multiplying machine for multiplying one factor, and another factor comprising a plurality of selected amounts which are summed up prior to multiplication, factor receiving means, means for analyzing said one factor represented on a record and entering the same in said factor receiving means, supplemental means for analyzing a record column having one or more perforations for selecting said amounts, a plurality of setup means, one for each possible perforation, means controlled by said supplemental analyzing means for selecting and setting up said setup means corresponding to the perforations analyzed, means for retaining said setup means set up for one or more amount entry cycles, amount receiving means for accumulatively receiving said selected amounts, a plurality of means set up in the machine for representing said selected amounts, entering means for said amount receiving means, a plurality of entry control means, one for each of the setup means and said amount representing means, means controlled by each selected setup means for selecting the related entry control means to be operable, means controlled by said entry control means when rendered operable to select the associated amount representing means for control of entries represented thereby, cyclically operable means for causing each of the selected setup means which have been set up to render the associated entry control means operable in a serial order in successive cycles to successively enter the plurality of amounts represented by said representing means in said amount receiving means to thereby represent the other factor, and means controlled by each entry control means when rendered operable to cause the release of the related setup means, and to condition the next entry control means to be rendered operable in the next cycle by said cyclically operable means under control of the associated setup means.

11. In a record controlled multiplying machine for multiplying one factor represented on a record, and another factor comprising a plurality of selected amounts which are summed up prior to multiplication, factor receiving means, means for analyzing said one factor represented on a record and entering the same in said factor receiving means, supplemental means for analyzing a record column having one or more perforations for selecting said amounts, amount receiving means for accumulatively receiving said selected amounts, a plurality of means set up in the machine for representing amounts to be selected, a plurality of entry control means, one for each of the aforesaid amount representing means, means controlled by said supplemental analyzing means for selecting the entry control means which are to be operable, means controlled by said entry control means when operable for selecting the associated amount representing means to control entries represented thereby, entering means for said amount receiving means, means under control of each entry control means when operable to cause said entering means, under control of the related selected amount representing means to effect the entry of selected amounts in said amount receiving means, and cyclically operable means for causing each of the entry control means which have been selected for operation to be operable in a serial order in successive entering cycles, whereby selected amounts are successively entered in said amount receiving means to represent said other factor.

12. In a record controlled multiplying machine for multiplying one factor represented on a record; and another factor comprising a plurality of selected amounts which are summed up prior to multiplication, factor receiving means, means for analyzing said one factor represented on a record and entering the same in said receiving means, supplemental means for analyzing a plurality of record columns, each having one or more perforations for selecting amounts to be entered, a plurality of amount receiving means, one for each record column, and each for accumulatively receiving selected amounts, a plurality of groups of means, one group for each amount receiving means, and each set up in the machine for representing amounts to be entered in an associated amount receiving means, a plurality of groups of entry control means, one for each group of the aforesaid amount representing means, means controlled by the selected entry means of each group to cause the selected amount representing means of the associated group to control entries represented thereby, means controlled by said supplemental analyzing means for selecting from the groups of entry control means the entry control means in each group which are to be operable according to the perforations analyzed, entering means, one for each of said amount receiving means, means to cause each of said entering means under control of the associated group of selected amount representing means to effect the entry of selected amounts in the associated amount receiving means, and cyclically operable means for causing each of the entry control means which have been selected for operation in each group to be operable in a serial order in successive entering cycles, whereby selected amounts are successively entered in each of said amount receiving means to represent subtotals of said other factor, a final factor receiving and representing means, and means for additively transferring in a plurality of transfer cycles the subtotal in each of said amount receiving means to said final factor receiving and representing means.

13. In a record controlled multiplying machine for multiplying one factor and another factor comprising a plurality of selected amounts which are summed up prior to multiplication, factor receiving means, means for analyzing said one factor represented on a record and entering the same in said receiving means, supplemental means for analyzing a plurality of record columns, each having one or more perforations for selecting amounts to be entered, a plurality of groups of setup means, one group for each record column and one set up for each possible perforation in a related record column, means controlled by said supplemental analyzing means for setting up said groups of setup means corresponding to the perforations analyzed, means for retaining each of said setup means set up to be utilized in an amount entry operation, a plurality of amount receiving means, one for each record column, and each for accumulatively receiving said selected amounts to represent subtotals of said other factor, a plurality of groups of means, one for each group of setup means, set up in the machine for representing said selected amounts, entering means for each of said amount receiving means, a plurality of groups of entry control means, one group for each group of the setup means and each group of said amount representing means for causing through the related entering means the entry of amounts in the respective amount receiving means according to the amount representing means selected by the associated group of entry control means, means controlled by each setup means of each group for selecting the related entry control means of the same group, repeatedly operated means for causing each of the setup means in each group which have been set up to render the associated entry control means in the same group operable in a serial order in successive entering operations to successively enter the plurality of amounts represented by selected amount representing means in the respective amount receiving means whereby each of the latter represents a subtotal, said repeatedly operated means causing the corresponding entry control means of a plurality of groups to cause entering operations in a plurality of respective amount receiving means simultaneously, means controlled by each entry control means in each group when rendered operable to cause the release of the related setup means of the same group, and to condition the next entry control means of the same group to be rendered operable under control of the associated setup means in the next entry operation by said repeatedly operated means, receiving means representing said other factor, and means for additively transferring in a plurality of transfer operations the subtotal amounts in each of said amount receiving means to said other factor representing and receiving means.

DAVID W. RUBIDGE.
ORVILLE B. SHAFER.

REFERENCES CITED

The following references are of record in the file of this patent:

UNITED STATES PATENTS

| Number | Name | Date |
|---|---|---|
| 2,090,103 | Bryce | Aug. 17, 1937 |
| 2,113,229 | Bryce | Apr. 5, 1938 |
| 2,138,337 | Bryce | Nov. 29, 1938 |
| 2,239,524 | Johnstone | Apr. 22, 1941 |
| 2,385,007 | Leathers | Sept. 18, 1945 |